US011620711B2

(12) United States Patent
Laurent et al.

(10) Patent No.: US 11,620,711 B2
(45) Date of Patent: *Apr. 4, 2023

(54) SYSTEM AND METHODS FOR TRADING IN MULTI-MODAL FREIGHT SHIPMENT DERIVATIVES

(71) Applicants: Pierre L. Laurent, Los Altos, CA (US); Petere Miner, Los Altos, CA (US)

(72) Inventors: Pierre L. Laurent, Los Altos, CA (US); Petere Miner, Los Altos, CA (US)

(73) Assignee: Future Freight Corporation, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,354

(22) Filed: Sep. 29, 2020

(65) Prior Publication Data

US 2021/0097618 A1 Apr. 1, 2021

Related U.S. Application Data

(63) Continuation of application No. 15/989,601, filed on May 25, 2018, now Pat. No. 10,817,946, which is a (Continued)

(51) Int. Cl.
*G06Q 40/00* (2012.01)
*G06Q 40/06* (2012.01)
(Continued)

(52) U.S. Cl.
CPC ............ *G06Q 40/06* (2013.01); *G06Q 10/02* (2013.01); *G06Q 10/0631* (2013.01);
(Continued)

(58) Field of Classification Search
CPC .... G06Q 40/06; G06Q 10/02; G06Q 10/0631; G06Q 10/08; G06Q 10/083;
(Continued)

(56) References Cited

U.S. PATENT DOCUMENTS 5,040,132 A 8/1991 Schuricht et al.
5,724,524 A 3/1998 Hunt et al.
(Continued)

FOREIGN PATENT DOCUMENTS

KR 20000049507 A 8/2000
KR 20020007541 A 1/2002
(Continued)

OTHER PUBLICATIONS

Tyan et al: "An evaluation of freight consolidation policies in global third party logistics", Omega—The International Journal of Management Science, Omega 31 (2003) 55-62, Accepted Oct. 15, 2002, Available online Jan. 24, 2003. (Year: 2003).*
(Continued)

*Primary Examiner* — Edward J Baird
(74) *Attorney, Agent, or Firm* — Squire Patton Boggs (USA)

(57) ABSTRACT

A system for facilitating freight transactions that includes a secure portal for receiving users' (carriers, forwarders, shippers, and market makers) data that includes orders and capacity postings between destinations. The system also includes a back-end modules configured for collecting capacity/shipping volume data to generate forecast data, managing derivative contracts, determining best possible routing given the orders and capacity postings, breaking the best possible routing into component segments that is then traded as derivative contracts, providing report, managing settlement and clearinghouse functions, and receiving risk assessment about the forecast data. The system further
(Continued)

includes an interface layer for facilitating communications between the portal and the back-end modules. The system moreover includes a contract and capacity management module configured for enabling the carriers and the forwarders to strategically position their capacity. The system yet also includes a real time integration layer configured for enabling a external systems to interact with the system.

26 Claims, 26 Drawing Sheets

Related U.S. Application Data continuation of application No. 13/959,571, filed on Aug. 5, 2013, now Pat. No. 9,984,414, which is a continuation of application No. 12/861,628, filed on Aug. 23, 2010, now Pat. No. 8,504,464, which is a continuation of application No. 10/810,306, filed on Mar. 25, 2004, now Pat. No. 7,783,557.

(60) Provisional application No. 60/457,167, filed on Mar. 25, 2003, provisional application No. 60/457,166, filed on Mar. 25, 2003, provisional application No. 60/457,165, filed on Mar. 25, 2003, provisional application No. 60/457,164, filed on Mar. 25, 2003, provisional application No. 60/457,163, filed on Mar. 25, 2003.

(51) Int. Cl.
| | |
|---|---|
| *G06Q 10/02* | (2012.01) |
| *G06Q 10/0631* | (2023.01) |
| *G06Q 10/08* | (2023.01) |
| *G06Q 10/083* | (2023.01) |
| *G06Q 10/0834* | (2023.01) |
| *G06Q 30/08* | (2012.01) |
| *G06Q 40/04* | (2012.01) |

(52) U.S. Cl.
CPC .......... *G06Q 10/08* (2013.01); *G06Q 10/083* (2013.01); *G06Q 10/0834* (2013.01); *G06Q 10/08345* (2013.01); *G06Q 30/08* (2013.01); *G06Q 40/00* (2013.01); *G06Q 40/04* (2013.01)

(58) Field of Classification Search
CPC ......... G06Q 10/0834; G06Q 10/08345; G06Q 30/08; G06Q 40/00; G06Q 40/04
See application file for complete search history.

(56) References Cited

U.S. PATENT DOCUMENTS

| | | | |
|---|---|---|---|
| 5,953,707 A | 9/1999 | Huang et al. | |
| 6,032,121 A | 2/2000 | Dietrich et al. | |
| 6,064,981 A | 5/2000 | Barni et al. | |
| 6,263,315 B1 | 7/2001 | Talluri | |
| 6,463,419 B1 | 10/2002 | Kluss | |
| 6,625,584 B1 | 9/2003 | Bains et al. | |
| 6,990,467 B1 | 1/2006 | Kwan | |
| 7,130,822 B1 | 10/2006 | Their et al. | |
| 7,181,345 B2 | 2/2007 | Rosenfeld et al. | |
| 7,333,942 B1 | 2/2008 | Cowles | |
| 7,395,237 B1* | 7/2008 | Hall | G06Q 40/04 705/37 |
| 7,668,761 B2* | 2/2010 | Jenkins | G06Q 10/087 705/28 |
| 2001/0032165 A1 | 10/2001 | Friend et al. | |
| 2001/0047284 A1 | 11/2001 | Blalock et al. | |
| 2002/0032573 A1 | 3/2002 | Williams et al. | |
| 2002/0042700 A1 | 4/2002 | Giles et al. | |
| 2002/0049667 A1* | 4/2002 | Navani | G06Q 10/08 705/37 |
| 2002/0069155 A1 | 6/2002 | Nafeh et al. | |
| 2002/0082970 A1 | 6/2002 | Ciroli et al. | |
| 2002/0120555 A1 | 8/2002 | Lerner | |
| 2002/0123911 A1 | 9/2002 | Bjerre et al. | |
| 2002/0133456 A1 | 9/2002 | Lancaster et al. | |
| 2002/0138290 A1 | 9/2002 | Metcalfe et al. | |
| 2002/0138293 A1 | 9/2002 | Kawahara et al. | |
| 2002/0138358 A1 | 9/2002 | Scheer | |
| 2002/0138396 A1 | 9/2002 | Brown et al. | |
| 2002/0178023 A1 | 11/2002 | Bjerre et al. | |
| 2003/0014288 A1 | 1/2003 | Clarke et al. | |
| 2003/0023465 A1 | 1/2003 | Smith et al. | |
| 2003/0069831 A1 | 4/2003 | Le et al. | |
| 2003/0033179 A1 | 5/2003 | Nagda et al. | |
| 2003/0084125 A1 | 5/2003 | Nagda et al. | |
| 2003/0097328 A1 | 5/2003 | Lundberg et al. | |
| 2003/0105661 A1 | 6/2003 | Matsuzaki et al. | |
| 2004/0010578 A1 | 1/2004 | Demetriades et al. | |
| 2004/0015409 A1 | 1/2004 | Chittenden et al. | |
| 2004/0024648 A1* | 2/2004 | Tatge | G06Q 30/0226 705/37 |
| 2004/0083116 A1* | 4/2004 | Joyce | G06Q 10/06393 714/E11.02 |
| 2004/0148217 A1 | 7/2004 | Lauring et al. | |
| 2004/0148236 A1 | 7/2004 | Steidlmayer | |
| 2004/0249699 A1 | 12/2004 | Laurent et al. | |
| 2004/0249742 A1 | 12/2004 | Laurent et al. | |
| 2004/0254807 A1 | 12/2004 | Laurent et al. | |
| 2005/0021346 A1* | 1/2005 | Nadan | G06Q 40/04 705/37 |
| 2005/0091089 A1 | 4/2005 | Bjerre et al. | |
| 2005/0091090 A1 | 4/2005 | Bjerre et al. | |
| 2005/0091091 A1 | 4/2005 | Bjerre et al. | |
| 2005/0091100 A1 | 4/2005 | Bjerre et al. | |
| 2005/0209913 A1 | 9/2005 | Wied et al. | |
| 2006/0036448 A1* | 2/2006 | Haynie | G06Q 10/10 705/37 |
| 2006/0053027 A1 | 3/2006 | Riggs et al. | |
| 2006/0218075 A1 | 9/2006 | Feldman et al. | |
| 2008/0040144 A1 | 2/2008 | Riggs et al. | |

FOREIGN PATENT DOCUMENTS

| | | |
|---|---|---|
| WO | WO 01/18671 A2 | 3/2001 |
| WO | WO 02/15083 A1 | 2/2002 |

OTHER PUBLICATIONS

"Final Office Action", U.S. Appl. No. 10/810,060; dated Sep. 11, 2008.
"Non Final Office Action", U.S. Appl. No. 10/810,060; dated Jan. 4, 2008.
"Non Final Office Action", U.S. Appl. No. 10/810,061; dated Feb. 25, 2009.
"Non Final Office Action", U.S. Appl. No. 10/810,061; dated Dec. 21, 2007.
"Non Final Office Action", U.S. Appl. No. 10/310,061; dated Nov. 15, 2008.
"Non Final Office Action", U.S. Appl. No. 10/810,306; dated Jan. 9, 2008.
"Final Office Action", U.S. Appl. No. 10/810,061; dated Jul. 9, 2008.
"Final Office Action", U.S. Appl. No. 10/810,306; dated Oct. 6, 2008.
"Non Final Office Action", U.S. Appl. No. 10/810,306; dated Jul. 10, 2009.
"First Office Action", Issued in Chinese Application No. 200480007773. 7; dated Mar. 27, 2009.
"Freight futures rounded up", New Zealand Manufacturer. Wellington: Mar. 1996. p. 14.
"Non Final Office Action" for U.S. Appl. No. 10/810,060; dated May 6, 2009.
"Notice of Allowance and Fees Due" for U.S. Appl. No. 10/810,060; dated Dec. 14, 2009.

(56) References Cited

OTHER PUBLICATIONS

"Notice of Allowance and Fees Due" for U.S. Appl. No. 10/810,061; dated Sep. 9, 2009.
Notice of Allowance and Fees Due for U.S. Appl. No. 10/810,306; dated Apr. 7, 2010.
"Examination Report", Issued in European Application No. 04758464. 4: dated Mar. 4, 2011.
"Office Action", Issued in European Application No. 093108158; dated Mar. 2, 2011.
"Notice of Reexamination", issued in Chinese Application No. 200480007773.7; dated Sep. 2, 2011.
"Second Office Action", Issued in Chinese Application No. 200480007773.7; dated Jan. 8, 2010.
"International Preliminary Report on Patentability", Application No. PCT/US2004/09424, dated Jan. 17, 2006.
International Search Report and Written opinion dated Jul. 6, 2005, PCT/USO4/09424.
Anonymous "Freight Futures Rounded Up", New Zealand Manufacturer, Wellington, Mar. 1996, 3 pages.
Anonymous, "Freight Futures Rounded Up", New Zealand Manufacturer, Wellington, Mar. 1996, 14 pages.
Balzola, "Balancing Container Inventories for Ocean Carriers", Massachusetts Institute of Technology Libraries, May 28, 1999.
Balzola, Ricardo "Balancing Container Inventories for Ocean Carriers", Massachusetts Institute of Technology Libraries, Massachusetts, May 28, 1999, 60 pages.
Batchelor, Charles "Transport Futures to be Traded on the Internet", London Edition, Financial Times, London (UK), Sep. 11, 1997, 2 pages.
Bergkvist, "The value of time and forecasting of flows in freight transportation", presented at the 41st ERSA congress in Zagreb 2001.
Bergkvist, Erik "The Value of Time and Forecasting of Flows in Freight Transportation", Presented at the 41st ERSA congress in Zagreb, Sweden, 2001, 34 pages.
Dalheim, "Freight Derivatives Trading and 'Value-at-Risk' in Tanker and Dry Bulk Shipping"; Marine Money, Inc., Jun. 2002.
Foster, "Air freight weathers the storm", Logistics Management and Distribution Report. Radnor: May 1999, vol. 38, Iss. 5; p. 55.
Haigh et al: "Hedging foreign currency, freight, and commodity futures portfolios—A note", The Journal of Futures Markets, Hoboken: Dec. 2002. vol. 22, Iss. 12; p. 1205.
Haigh, "Cointegration, unbiased expectations, and forecasting in the BIFFEX freight futures market", The Journal of Futures Markets, Hoboken: Jul. 2000. vol. 20, Iss. 6; p. 545.
Haigh, "Cointegration, Unbiased Expectations, and Forecasting in the BIFFEX Freight Futures Market", The Journal of Futures Markets, Hoboken, Jul. 2000, vol. 20, Issue 6, 14 pages.
Regan et al: "Modeling Freight Demand and Shipper Behavior: State of the Art, Future Directions", Department of Civil and Environmental Engineering and Institute of Tranportation Studies University of California Irvine, California, USA (Year: 2002).
Tower, Courtney "Mega-Ships Drive Freight's Future", 5th Edition, Journal of Commerce, New York, Oct. 22, 1998, 3 pages.
Vergottis, "An Econometric Model of the World Shipping Market", The City University, London, United Kingdom, 1988, 2 pages.
Vergottis, "An Econometric model of the world shipping markets", The City University, London, United Kingdom, 1988, 448 pages; AAT DX88207.
Wilson, "Airfreight: Poised for expansion", Transportation & Distribution. Cleveland: Aug. 1997, vol. 38, issue 8; p. 43, 5 pgs.

\* cited by examiner

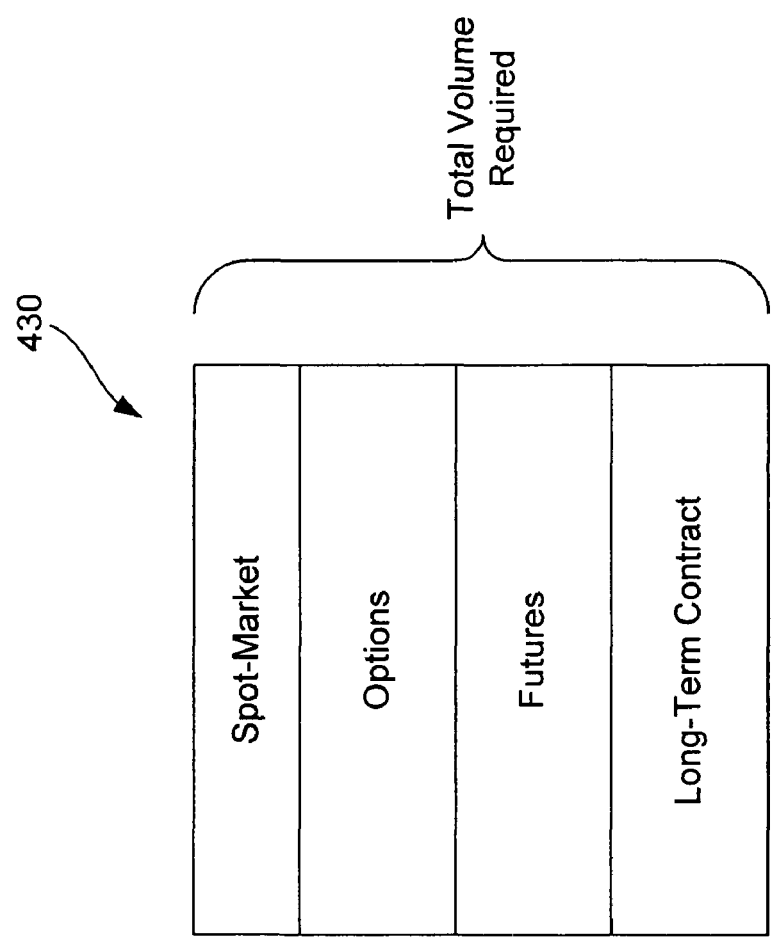

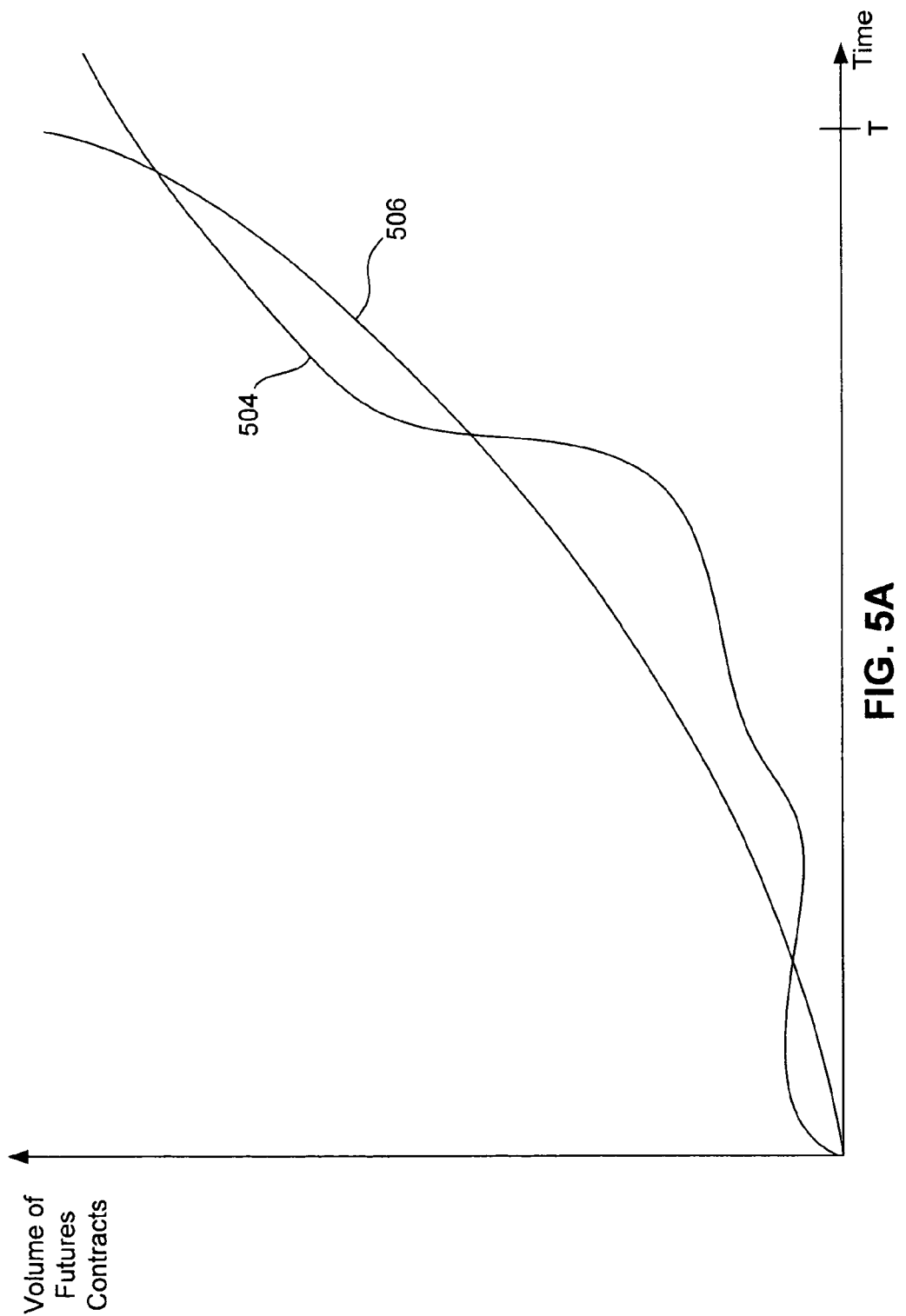

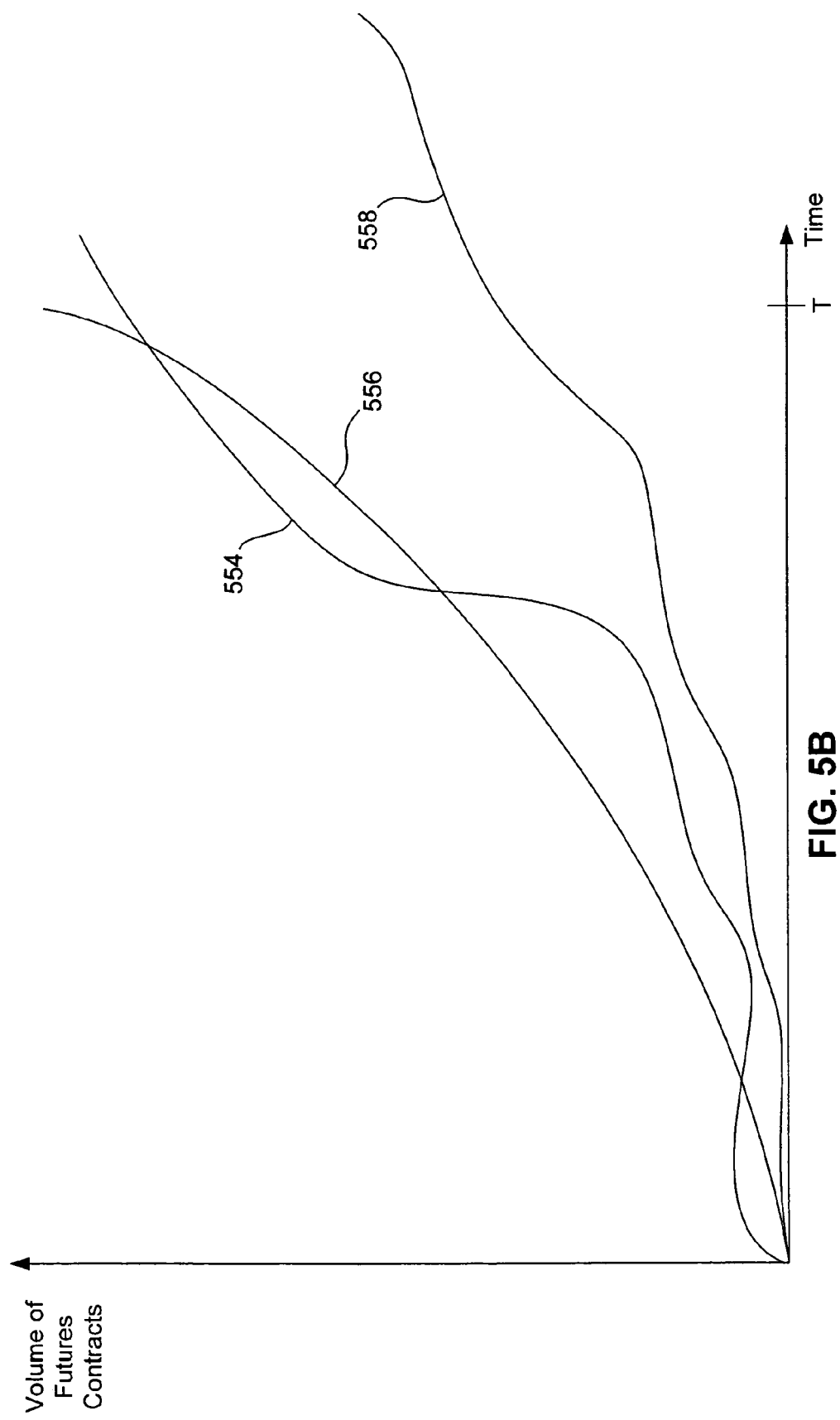

$$\text{Index}_v = \frac{\sum_{i=1}^{31} \text{Price } i \times \text{Volume } i}{\sum_{i=1}^{31} \text{Volume } i}$$

FIG. 6

▲▶ Future Freight ™

Summary | Market | Commitment | Order | Forecast | Indices | History | Signout Indices: Asia

Enter Trade Details

Required

- Action: Buy ▽
- From: HKG ▽
- To: SFO ▽
- Month: Feb-04 ▽
- Day of the Week: Monday(1) ▽
- Type of Order: Market ▽
- Service Level: Express ▽
- Dim Wt.: [Calc.]
- Price: [    ]
- Make Order Private: ☐
- Type of Trading: Express ▽

[OK] [Cancel]

Optional

- Airlines: Select ▽
- Position: Select ▽
- Cargo Type: Select ▽

FIG. 11

▲▶ Future Freight ™

Summary  Market  Commitment  Order  Forecast  Indices  History  Signout

Select Region: From: Asia ▼  To: US-West ▼                                    Forwarder Dashboard Futures View ▼

Market                                                                    1202

| Orig | Dest | Month  | Service | Bid    | Ask    | Weight |
|------|------|--------|---------|--------|--------|--------|
| HKG  | SFO  | Nov-03 | 2 Day   | $2.21  |        | 134    |
| TPE  | SFO  | Nov-03 | 2 Day   | $2.30  | $2.31  | 134    |
| TPE  | LAX  | Jan-04 | Express | $2.86  | $2.87  | 150    |
| HKG  | SFO  | Feb-04 | Express | $2.45  | $2.48  | 100    |
| HKG  | LAX  | Dec-03 | 1 Day   | $2.23  | $2.34  | 100    |
| PVG  | SEA  | Dec-03 | Express | $2.42  | $2.49  | 100    |
| ICN  | LAX  | Nov-03 | 1 Day   | $2.86  | $2.89  | 75     |

My Commitments                                                            1206

| Orig | Dest | Month  | Service | Price | Curr Price | Gain  | % of Forecast | Wt  | Action |
|------|------|--------|---------|-------|------------|-------|---------------|-----|--------|
| HKG  | SFO  | Nov-03 | Express | $1.30 | $1.80      | 38    | 16%           | 76  | B      |
| HKG  | SFO  | Dec-03 | Express | $1.30 | $1.30      | 0     | 0%            | 20  | B      |
| PVG  | SEA  | Nov-03 | Express | $2.23 | $2.79      | 6.72  | 12%           | 12  | B      |
| TPE  | LAX  | Feb-04 | Express | $2.86 | $2.86      | 0     | 0%            | 54  | B      |
| TPE  | SFO  | Jan-04 | Express | $2.23 | $2.12      | -13.2 | 13%           | 120 | B      |
| HKG  | SEA  | Dec-03 | Express | $1.90 | $6.00      | 176.3 | 9%            | 43  | S      |

My Orders                                                                 1204

| Orig | Dest | Month  | Service | Type of Order | Limit Price | Weight |
|------|------|--------|---------|---------------|-------------|--------|
| SIN  | SFO  | Dec-03 | 1 Day   | Buy           | $1.30       | 78     |
| SIN  | SFO  | Nov-03 | Express | Sell          | $2.48       | 54     |
| TPE  | SFO  | Dec-03 | 1 Day   | Sell          | $2.88       | 98     |
| SIN  | SFO  | Feb-04 | Express | Buy           | $1.58       | 45     |
| ICN  | LAX  | Feb-04 | Express | Sell          | $2.67       | 12     |
| HKG  | LAX  | Jan-04 | 1 Day   | Buy           | $1.56       | 40     |
| ICN  | SFO  | Nov-03 | 1 Day   | Iceberg Sell  | $1.54       | 150    |
| TPE  | LAX  | Nov-03 | Express | Sell          | $3.50       | 14     |

Forecast                                                                  1208

| Orig  | Dest | Shipper | Month  | Cargo Type | Vol  | Act Wt | Trd Wt | Conf | Qual |
|-------|------|---------|--------|------------|------|--------|--------|------|------|
| TPE   | SFO  | Cisco   | Nov-04 | Electronic | 500  | 22     | 21     | 63%  | B-   |
| TPE   | SFO  | Sony    | Nov-04 | Electronic | 200  | 15     | 15     | 78%  | B+   |
| TPE   | SFO  | Nike    | Nov-04 | Generic    | 600  | 0.5    | 1      | 28%  | C-   |
| Total |      |         |        |            | 1300 | 37.5   | 37     |      |      |
| TPE   | SFO  | Sony    | Dec-04 | Electronic | 317  | 30     | 30     | 45%  | B+   |
| TPE   | SFO  | Nike    | Dec-04 | Generic    | 600  | 2      | 3      | 71%  | B-   |
| Total |      |         |        |            | 917  | 32     | 33     |      |      |

Indices: Asia/US $2.88₈₅ US/Asia $0.85₂₅ Asia/EU $2.10₇₆ EU/Asia $0.54₃₈ EU/US $0.78₄₅ US/EU $0.68₁₅.... Routes TPE-SFO $1.89₁₈ HK-LAX $2.4₅₅

FIG. 12A

▲▲ Future Freight ™

Summary  Market  Commitment  Order  Forecast  Indices  History  Signout

Carrier Dashboard

Select Region: From: Asia ▼ To: US-West ▼   Futures View ▼

Market

| Orig | Dest | Month | Service | Bid | Ask | Weight |
|---|---|---|---|---|---|---|
| HKG | SFO | Nov-03 | 2 Day | $2.21 | | 134 |
| TPE | SFO | Nov-03 | 2 Day | $2.30 | $2.31 | 134 |
| TPE | LAX | Jan-04 | Express | $2.86 | $2.87 | 150 |
| HKG | SFO | Feb-04 | Express | $2.45 | $2.48 | 100 |
| HKG | LAX | Dec-03 | 1 Day | $2.23 | $2.34 | 100 |
| PVG | SEA | Dec-03 | Express | $2.42 | $2.49 | 100 |
| ICN | LAX | Nov-03 | 1 Day | $2.86 | $2.89 | 75 |

My Commitments

| Orig | Dest | Month | Service | Price | Curr Price | Gain | % of Forecast | Wt | Action |
|---|---|---|---|---|---|---|---|---|---|
| HKG | SFO | Nov-03 | Express | $1.30 | $1.80 | 38 | 16% | 76 | B |
| HKG | SFO | Dec-03 | Express | $1.30 | $1.30 | 0 | 0% | 20 | B |
| PVG | SEA | Nov-03 | Express | $2.23 | $2.79 | 6.72 | 12% | 12 | B |
| TPE | LAX | Feb-04 | Express | $2.86 | $2.86 | 0 | 0% | 54 | B |
| TPE | SFO | Jan-04 | Express | $2.23 | $2.12 | -13.2 | 13% | 120 | B |
| HKG | SEA | Dec-03 | Express | $1.90 | $6.00 | 176.3 | 9% | 43 | S |

My Orders

| Orig | Dest | Month | Service | Type of Order | Limit Price | Weight |
|---|---|---|---|---|---|---|
| SIN | SFO | Dec-03 | 1 Day | Buy | $1.30 | 78 |
| SIN | SFO | Nov-03 | Express | Sell | $2.48 | 54 |
| TPE | SFO | Dec-03 | 1 Day | Sell | $2.88 | 98 |
| SIN | SFO | Feb-04 | Express | Buy | $1.58 | 45 |
| ICN | LAX | Feb-04 | Express | Sell | $2.67 | 12 |
| HKG | LAX | Jan-04 | 1 Day | Buy | $1.56 | 40 |
| ICN | SFO | Nov-03 | 1 Day | Iceberg Sell | $1.54 | 150 |
| TPE | LAX | Nov-03 | Express | Sell | $3.50 | 14 |

Forecast

| Orig | Dest | Conf | Month | Cargo Type | Vol | Act Wt | Trd Wt | Quality |
|---|---|---|---|---|---|---|---|---|
| TPE | SFO | 64% | Nov-04 | Electronic | 500 | 22 | 21 | B- |
| TPE | LAX | 59% | Nov-04 | Electronic | 200 | 15 | 15 | B+ |
| TPE | SEA | 23% | Nov-04 | Generic | 600 | 0.5 | 1 | C- |
| Total | | | | | 1300 | 37.5 | 37 | |
| TPE | LAX | 46% | Dec-04 | Electronic | 317 | 30 | 30 | B+ |
| TPE | SEA | 75% | Dec-04 | Generic | 600 | 2 | 3 | B- |
| Total | | | | | 917 | 32 | 33 | |

Indices: Asia/US $2.88₈₅  US/Asia $0.85₇₅  Asia/EU $2.10₇₆  EU/Asia $0.54₃₈  EU/US $2.88₄₅  US/EU $0.78₃₅ ...  Routes TPE-SFO $1.89₁₈  HK-LAX $2.4₅₅

FIG. 12B

▲▲ Future Freight ™

Summary  Market  Commitment  Order  Forecast  Indices  History  Signout

Select Region: From: Asia ▼  To: US-West ▼                                    Carrier Dashboard

Market

| Orig | Dest | Month  | Service | Bid  | Ask  | Strike | Weight |
|------|------|--------|---------|------|------|--------|--------|
| HKG  | SFO  | Nov-03 | 2 Day   | 0.05 | 0.06 | $2.31  | 134    |
| TPE  | SFO  | Nov-03 | 2 Day   | 0.25 | 0.28 | $2.32  | 134    |
| TPE  | LAX  | Jan-04 | Express | 0.07 | 0.12 | $2.59  | 150    |
| HKG  | SFO  | Feb-04 | Express | 0.12 | 0.14 | $2.07  | 100    |
| HKG  | LAX  | Dec-03 | 1 Day   | 0.14 | 0.28 | $2.53  | 100    |
| PVG  | SEA  | Dec-03 | Express | 0.15 | 0.16 | $2.43  | 100    |
| ICN  | LAX  | Nov-03 | 1 Day   | 0.47 | 0.48 | $2.17  | 75     |

My Commitments

| Orig | Dest | Month  | Service | Strike Price | Prem | Curr Price | Gain  | % of Forecast | Wt  | Action |
|------|------|--------|---------|--------------|------|------------|-------|---------------|-----|--------|
| HKG  | SFO  | Nov-03 | Express | $1.30        | 0.07 | $1.80      | 38    | 16%           | 76  | B      |
| HKG  | SFO  | Dec-03 | Express | $1.30        | 0.09 | $1.30      | 0     | 0%            | 20  | B      |
| PVG  | SEA  | Nov-03 | Express | $2.23        | 0.21 | $2.79      | 6.72  | 12%           | 12  | B      |
| TPE  | LAX  | Feb-04 | Express | $2.86        | 0.14 | $2.86      | 0     | 0%            | 54  | B      |
| TPE  | SFO  | Jan-04 | Express | $2.23        | 0.09 | $2.12      | -13.2 | 13%           | 120 | B      |
| HKG  | SEA  | Dec-03 | Express | $1.90        | 0.10 | $6.00      | 176.3 | 9%            | 43  | S      |

My Orders

| Orig | Dest | Month  | Service | Type of Order | Limit | Strike | Weight |
|------|------|--------|---------|---------------|-------|--------|--------|
| SIN  | SFO  | Dec-03 | 1 Day   | Buy           | 0.05  | $1.30  | 78     |
| SIN  | SFO  | Nov-03 | Express | Sell          | 0.12  | $2.48  | 54     |
| TPE  | SFO  | Dec-03 | 1 Day   | Sell          | 0.24  | $2.88  | 98     |
| SIN  | SFO  | Feb-04 | Express | Buy           | 0.14  | $1.58  | 45     |
| ICN  | LAX  | Feb-04 | Express | Sell          | 0.26  | $2.67  | 12     |
| HKG  | LAX  | Jan-04 | 1 Day   | Buy           | 0.18  | $1.56  | 40     |
| ICN  | SFO  | Nov-03 | 1 Day   | Iceberg Sell  | 0.43  | $1.54  | 150    |
| TPE  | LAX  | Nov-03 | Express | Sell          | 0.44  | $3.50  | 14     |

Forecast

| Orig  | Dest | Conf | Month  | Cargo Type | Vol  | Act Wt | Trd Wt | Quality |
|-------|------|------|--------|------------|------|--------|--------|---------|
| TPE   | SFO  | 64%  | Nov-04 | Electronic | 500  | 22     | 21     | B-      |
| TPE   | LAX  | 59%  | Nov-04 | Electronic | 200  | 15     | 15     | B+      |
| TPE   | SEA  | 23%  | Nov-04 | Generic    | 600  | 0.5    | 1      | C-      |
| Total |      |      |        |            | 1300 | 37.5   | 37     |         |
| TPE   | LAX  | 46%  | Dec-04 | Electronic | 317  | 30     | 30     | B+      |
| TPE   | SEA  | 75%  | Dec-04 | Generic    | 600  | 2      | 3      | B-      |
| Total |      |      |        |            | 917  | 32     | 33     |         |

Indices: Asia/US $2.88₈₅ US/Asia $0.85₂₅ Asia/EU $2.10₇₆ EU/Asia $0.54₃₈ EU/US $0.78₄₅ US/EU $0.68₃₅ ... Routes TPE-SFO $1.89₁₈ HK-LAX $2.4₅₅

Shipper Confidence Level Factors

| Factor | Weight | High Risk | Low Risk | Notes |
|---|---|---|---|---|
| DEMAND | 25% | Low Certainty | High Certainty | Customer Demand |
| MFG READINESS | 25% | Unprepared | Ready | Includes availability of supplied material, internal resource readiness used to build product or part, set up required to build product or part |
| MFG LOCATION | 5% | New Location | >90 days | Sensitivity about where product is being built |
| CAPACITY | 20% | 100 kg | >10 tonnes | Amount of capacity to be booked |
| PRODUCT | 5% | New Product | >6 months | Number of months product has been manufactured |
| LANE | 15% | New Lane | >1 year | Number of months lane has been used for shipping |
| LANE STABILITY | 5% | Risky | Stable | Estimate of lane stability (i.e. wars, strikes, etc.) |

FIG. 14

SYSTEM AND METHODS FOR TRADING IN MULTI-MODAL FREIGHT SHIPMENT DERIVATIVES

This application is a continuation of Ser. No. 15/989,601, filed May 25, 2018, now U.S. Pat. No. 10,817,946, which is a continuation of Ser. No. 13/959,571, filed Aug. 5, 2013, now U.S. Pat. No. 9,984,414, which is a continuation of Ser. No. 12/861,628, filed Aug. 23, 2010, now U.S. Pat. No. 8,504,464, which is a continuation of Ser. No. 10/810,306, filed Mar. 25, 2004, now U.S. Pat. No. 7,783,557, which claims the benefit of the following applications: provisional application No. 60/457,164, filed Mar. 25, 2003; provisional application No. 60/457,167, filed Mar. 25, 2003; provisional application No. 60/457,166, filed Mar. 25, 2003; provisional application No. 60/457,165, filed Mar. 25, 2003; and provisional application No. 60/457,163, filed Mar. 25, 2003; all of which are incorporated herein by reference in their entirety.

BACKGROUND OF THE INVENTION

The freight industry involves moving goods, e.g., bulk, liquid, containers, and the like, between destinations using a variety of transportation modes. Over the years, the industry has evolved to the point whereby the vast majority of the shipments today generally involves four major participants: 1) the carrier who operates the transportation equipment, 2) the shipper who tends to be the producer of the goods to be shipped, 3) the forwarder who aggregate goods from shippers to more efficiently employ the capacity offered by the carriers between destination points, and 4) market makers who derive profit from trading in shipping contracts but improve liquidity in the freight market as a byproduct of their participation.

The multi-modal freight industry. Shipment between any two destinations may involve multiple transportation modes and multiple possible routings. To facilitate discussion, FIG. 1A shows some hypothetical shippers, forwarders, and carriers involved in shipping between Hong Kong (HKG) and Reno, Nev. (Reno). In this example, shipper 102 and shipper 104 may employ trucks to transport the goods to the forwarder 106 in Hong Kong to be shipped to a receiving entity in Reno. Depending on the nature of the goods to be shipped, the transportation requirements specified by the shippers, and other factors, forwarder 106 generally tries to look for the lowest cost shipment method that can fulfill the shipping orders.

For example, forwarder 106 may choose to route the goods via Alaska by air (108) to arrive at a warehouse at the San Francisco Airport (SFO). From SFO, the goods may be transported by air (110) to Reno, or may be sent by truck (112a and 112b) to Reno via Sacramento (SAC). Forwarder 106 may also choose to ship by sea (114) to the Oakland port (OAK). From OAK, the goods may be shipped via truck (116 and 112b) to Reno via Sacramento (SAC). Alternatively, forwarder 106 may choose to ship by air (118) to Los Angeles (LAX). From LAX, the goods may be shipped via truck (120 and 112b) to Reno via Sacramento (SAC) or via air (122) directly to Reno. As can be appreciated from FIG. 1A, freight shipment involves a multiplicity of modes (e.g., sea, air, or truck) and routes.

Long-term contracts and spot market purchases. Generally speaking, the relationships among shippers, forwarders, and carriers are historically governed by two mechanisms: spot market purchase and long-term contract. To facilitate discussion, FIG. 1B shows that the relationship between forwarder 130 and carrier 132, which is governed by spot market purchase 136 and long-term contract 134. Forwarder 130 may wish to enter into a long term contract 134 with a carrier 132 in order to lock in the price and to assure capacity at a future date. Likewise, carrier 132 may wish to lock in the price and to ensure that the capacity will be sold in advance to minimize the risk of underutilization. An example long-term contract may be an agreement to purchase 30 tons of shipping for $3.00 per ton on a ship leaving from Hong Kong to OAK 6 months from the date the long-term contract is signed.

A spot market purchase represents a purchase by forwarder 130 of the capacity needed to ship goods in the immediate near future. An example spot purchase may be a purchase of shipping capacity of 20 tons on a ship leaving in two days from Hong Kong to OAK. The time frame between the time a spot market purchase is made and the time the goods is transported may be as little as a few hours to allow for loading, or may be as long as a week or longer, depending on the custom of the particular industry segment concerned. In making a spot market purchase, the forwarder 130 must typically pay what the market would bear at the time.

Capacity and Pricing Risks. The decision regarding which mode(s) and route(s) to employ for a particular shipment of goods is a complex one, involving factors such as the maximum permissible time en-route, the price paid by the shipper, and the availability of shipping capacity from the carriers (which itself is complex and may involve other factors such as the nature of the goods shipped, weather, fuel cost, labor availability, etc.). Likewise, the decision regarding whether to employ a long-term contract, a spot-market purchase, or a combination thereof to fulfill a shipping order is a complex one, involving a multitude of factors. These factors change all the times, thereby continually introducing pricing and capacity risks for shippers, forwarders, and carriers.

For shippers, an overriding concern is the ability to ship goods in a timely manner. Some shipper cannot tolerate capacity starvation, which is a condition characterized by an insufficient capacity to ship the goods in a timely manner. To minimize such risks, a shipper would enter into long-term contracts with forwarders or carriers to ensure that the capacity is guaranteed for certain critical shipments at future dates.

Another risk is overpurchasing, which may occur when the shipper buys more capacity under a long-term contract than required at shipment time. To mitigate the overpurchasing risk, the shipper may purchase less than the required capacity under long-term contracts, and may make up the difference using spot-market purchases.

Both long-term contracts and spot-market purchases involve pricing risks. For example, at the time of shipping, the spot-market price may be much higher than the long-term contract price, making the spot-market purchase extremely costly for the buyer (e.g., the forwarder if capacity starvation is to be addressed via spot market purchases). Conversely, the spot-market price may be much lower than the long-term contract price. In this situation, it may be said that the buyer overpaid in exchange for a lower risk of capacity starvation.

Forwarders of course would like to maximize profits by buying shipping capacity from carriers at the lowest cost possible and selling capacity to shippers at a highest price that can be obtained. If a forwarder miscalculates and purchases too little capacity from carriers, that forwarder risks defaulting on existing long-term contracts with shippers. In this case, the forwarder must purchase capacity on the spot market to make up the difference at shipment time. Again, at the time of shipping, the spot-market price may be much higher than the long-term contract price with the shipper, lowering or eliminating any profit for the forwarder. Conversely, the spot-market price may be much lower than the long-term contract price with the shipper. In this situation, the forwarder benefits since it can fulfill the existing long-term contracts with shippers using capacity bought at a much lower spot-market price.

The same considerations exist in the relationship between a forwarder and the carriers. If a forwarder miscalculates and purchases too little capacity from carriers, that forwarder risks defaulting on existing long-term contracts with shippers. In this case, the forwarder must purchase capacity on the spot market to make up the difference at shipment time. Again, at the time of shipping, the spot-market price may be much higher than the long-term contract price with the shipper, lowering or eliminating any profit for the forwarder. Conversely, the spot-market price may be much lower than the long-term contract price with the shipper. In this situation, the forwarder benefits since it can fulfill the contract with capacity bought at a much lower spot-market price.

Carriers have fixed assets and perishable products in the form of transportation means (e.g., planes, trains, trucks, ships) that must leave on time irrespective whether the capacity is sold. Accordingly, a carrier is typically highly concerned with selling all of its available capacity before the time of departure. While long-term contracts with forwarders guarantee that the capacity will be sold, the use of long-term contracts may lower a carrier's potential profit. This is because the profit margin per shipping unit on a long-term contract is typically (but not always) lower than the profit margin obtainable when sold on the spot market.

A carrier's potential profit may be lowered through factors that are not in their control. For example, war, changes in fuel pricing, changes in tourism patterns (which affect the number of airplanes flying between two destinations, for example), labor strikes, etc., may affect the overall availability of capacity, causing fluctuations in the spot-market pricing. If, at the time of shipping, the spot-market price is much higher than the long-term contract price with the forwarder, every ton shipped under a long-term contract instead of pursuant to a spot-market purchase lowers the profit that the carrier could have obtained. Conversely, the spot-market price may be much lower than the long-term contract price with the forwarder. If the carrier did not fill the transport with long-term contract goods, the carrier will need to sell the remaining capacity on the spot market, in effect carrying some of the goods at a lower price than the carrier could have charged under a long-term contract.

FIGS. 1C and 1D illustrate these concepts of pricing risk and capacity risk. As shown in FIG. 1C, if the forwarder guesses incorrectly and the price is $2.00 per ton on the spot market at the time of performance T1 of FIG. 1C, the forwarder in effect overpaid by $1.00 per ton for the capacity employed. On the other hand, if the price is $5.00 per ton on the spot market at the time of performance T1, the carrier would have "lost" $2.00 per ton of potential profit for every ton of shipping performed under a long-term contract instead of under a spot market order.

With regard to capacity risks, if the forwarder fails to secure enough capacity via long-term contracts as shown in the example of FIG. 1D, the forwarder may be forced to purchase the remaining required capacity on the spot market if possible. In some cases, there is capacity on the spot market but such capacity, when bought on a short notice, may be extremely expensive. In other cases, there may be no capacity at any price.

Unequal access to information. Although the participants all have risks, each participant has a different degree and type of risk. This is partly due to the fact that the type and quality of information available to each participant is different.

Consider the factors that influence the decision making process of shippers and forwarders with regard to freight shipment. Forwarders and shippers base their freight shipping decisions (e.g., long-term contracts versus spot contracts, price, volume, etc.) partly on their best guesses regarding the aggregated demand from all shippers as well as the aggregated shipping capacity at shipping time.

If the aggregate shipping volume from shippers is high at shipping time, the spot market price would also tend to be high as shippers and forwarders compete for the available shipping capacity. The aggregated demand from shippers may depend on factors such as the consumer demand for goods, inventory level at retailers, etc. With respect to current and forecasted shipping volume, shippers tend to have the most information, followed by forwarders and then carriers. Line 180 on the plot of FIG. 1E illustrates the distribution of shipping volume information among the shipper, the forwarder, and the carrier. Since carrier 174 owns fixed, perishable assets in the form of departing transports, the carrier bears the highest risk for incorrectly forecasting the shipping volume. This is shown by line 182 of FIG. 1E.

The available capacity from the carriers must also be taken into consideration. Factors such as weather, war, labor strikes, fuel cost, tourism patterns, etc. all determine the shipping capacity available at any given point in time. Carrier 174 naturally has a deeper understanding of their own capacity and capacity trends over time and consequently has an edge over forwarder 172 and shipper 170 in determining the current capacity and forecasting the future capacity. This is shown by line 184 of FIG. 1E. Since shipper 170 is at the highest risk if there is insufficient capacity to ship the goods when needed (e.g., capacity starvation), the highest capacity-related risk is borne by shipper 170. This is shown by line 186 of FIG. 1E.

Some known approaches. Attempts have been made to streamline the process of matching buyers and sellers in the freight industry. Instead of leaving shippers, forwarders, and carriers to negotiate long-term contracts and conduct spot purchases directly with one another, electronic exchanges have been created. Using modern computers and a worldwide network such as the Internet, sellers can post available capacity and buyers can post orders for viewing. Tools are also available to match up orders and capacity based on the terms posted so that the buyers and sellers can efficiently find one another.

FIG. 2 shows a prior art electronic exchange 202 for facilitating commerce between carrier 204, forwarder 206, and shipper 208. Via electronic exchange 202, carrier 204 can post future capacity and a limit price 210 (e.g., 300 tons of capacity from Hong Kong to Oakland, available on Jun. 10, 2004 at no less than $1.50 per ton). This post may be utilized by forwarder 206 or shipper 208 to satisfy their shipping requirements. Forwarder 206 may likewise post either the available capacity (and desired price) 212 that it has purchased earlier or the required capacity (and maximum price) 214 that it wishes to purchase. Shipper 208 may likewise employ electronic exchange 202 to post shipping order and limit price 216 (e.g., 10 tons from Hong Kong to Oakland on Jun. 10, 2004 at no more than $1.60 per ton). Employing a matching algorithm, electronic exchange 202 may then match up buyers (e.g., shippers or forwarders) with sellers (e.g., carriers or forwarders). The matches are forwarded by the respective parties via arrows 232, 234, and 236 as shown.

In addition to facilitating direct purchases of capacity between buyers and sellers (known as forward contract transactions), electronic transaction system may also facilitate the trading of futures in capacity between specific destinations. A futures contract, as is well known in the commodity industry, is a contract entered into between two parties, to specify the contractual terms to be performed at a specified point in time in the future. A futures contract in bulk freight may specify, for example, 100 tons of bulk shipping from Hong Kong to Oakland leaving on Jul. 1, 2004 at $1.80 per ton. In this sense, capacity futures are treated in the same manner as well-known futures in coffee, pork, sugar, etc. Further, just like their counterparts in the agricultural futures market, individuals in the capacity futures market can employ futures contracts to speculate and profit on trades pertaining to freight shipments between specific destinations. A variation of futures trading is index trading in which an index (or weighted average or mean between high and low prices) of transaction prices is calculated in real-time. Trader can in essence, bet on future values of the index, the gains or losses being proportional to the difference between the value estimated by the trader (the strike) and the actual value at the pre-agreed date. Index futures are cash settled and are routinely used in the financial industry to manage risks.

Although prior art electronic exchange 202 is useful for matching up buyers and sellers, there are shortcomings. Existing prior art electronic exchange systems have been uni-modal, i.e., limited to ocean shipping of bulk goods. Two such electronic exchanges are known to the inventors: Imarex (www.Imarex.com) and Baltic Exchange (www.balticexchange.com). This type of prior art electronic exchange is not well-suited to handle shipping between destinations that can be served by multiple shipping modes (e.g., sea, truck, train, or air) and/or destinations that may be routed through different intermediate shipping points (e.g., Alaska, San Francisco, Los Angeles, Oakland, Sacramento in the aforementioned example of FIG. 1A).

Further, participants in such electronic exchanges still suffer from the aforementioned uneven distribution of information. For example, carriers still suffer from a lack of reliable information regarding shipping volume and shippers still do not have reliable information regarding capacity even though their published orders can be matched more readily via the prior art electronic exchange system. This lack of reliable information also affects the ability of speculative futures traders (referred to herein as market makers) to intelligently evaluate trades in capacity futures, causing some traders to shy away from participating fully or at all in the capacity futures market. In turn, liquidity suffers.

The inherent inefficiency in the freight market has created opportunities for electronic capacity aggregators. As understood by the inventors, an electronic capacity aggregator such as one attempted by the now-defunct Enron Corporation of Houston, Tex., attempts to create scarcity by buying up a high percentage of the trucking capacity between two destinations (e.g., between Austin, Tex. and San Jose, Calif.). The capacity is purchased via future contracts from carriers, which the electronic capacity aggregator then attempts to resell to forwarders (and perhaps even shippers) at a profit.

By exerting a high degree of market control, i.e., over the trucking capacity available, such electronic clearinghouses can minimize pricing risk to themselves. In other words, by consolidating most of the trucking capacity between two destinations under their control, an electronic clearinghouse has almost perfect information regarding the shipping capacity available between two destination points and can create artificial scarcity and maximize profit by controlling the release of this now scarce commodity to forwarders and shippers.

Again, this model has limited applications and does nothing to address the information disparity among the existing participants or the multi-modal nature of the freight industry. Although some may argue that the use of an electronic clearinghouse provides open pricing information to participants so they can be aware of how much capacity would cost for any particular route for any particular date, it may also be argued that such clearinghouse arrangement increases the risk of abuse if the clearinghouse succeeds in completely or nearly completely control shipping capacity between any two destination points.

SUMMARY OF INVENTION

The invention relates, in one embodiment, to a browser window configured to display on a display screen data that facilitates freight shipment between a first geographic location and a second geographic location. The browser window is accessible via a computer network. There is included a first data section configured to display derivative contract data pertaining to shipment capacity offered by carriers between the first geographic location and the second geographic location, the derivative contract data being associated with at least two of a air mode, a sea mode, a train mode, and a truck mode. There is also included a second data section configured to be viewed simultaneously with the first data section, the second data section displaying forecast data pertaining to demand forecasts between the first geographic location and the second geographic location by shippers.

In another embodiment, the invention relates to a method for facilitating freight shipment between a first geographic location and a second geographic location. The method includes displaying in a first data section of a browser window derivative contract data pertaining to shipment capacity offered by carriers between the first geographic location and the second geographic location, the derivative contract data being associated with at least two of a air mode, a sea mode, a train mode, and a truck mode. The method also includes displaying in a second data section of the browser window forecast data pertaining to demand forecasts between the first geographic location and the second geographic location by shippers, the second data section being configured to be viewed simultaneously with the first data section, the browser window being configured to be accessible via a computer network.

In another embodiment, the invention relates to an article of manufacture comprising a program storage medium having computer readable code embodied therein, the computer readable code being configured to facilitating freight shipment between a first geographic location and a second geographic location. There is included computer readable code for displaying in a first data section of a browser window derivative contract data pertaining to shipment capacity offered by carriers between the first geographic location and the second geographic location, the derivative contract data being associated with at least two of a air mode, a sea mode, a train mode, and a truck mode. There is further included computer readable code for displaying in a second data section of the browser window forecast data pertaining to demand forecasts between the first geographic location and the second geographic location by shippers, the second data section being configured to be viewed simultaneously with the first data section, the browser window being configured to be accessible via a computer network.

The invention further includes other computer-implemented techniques for fulfilling shipment orders and facilitating trading in capacity futures and/or options involving shippers, forwarders, carriers, and market makers as detailed hereinbelow. Additionally, the invention also includes computer hardware, computer network, and computer software for electronically fulfilling shipment orders and facilitating trading in capacity futures and/or options involving shippers, forwarders, carriers, and market makers as detailed hereinbelow.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4C shows how the capacity requirement of a given shipping order from a shipper can be fulfilled by a mix of long-term contracts, futures contracts, option contracts, and spot-market purchases using the risk management tools provided by the FFS.

FIG. 5A is a chart showing the relationship between time and capacity released, as measured by the number of futures contracts sold, for any particular segment.

FIG. 5B depicts an analogous graph as FIG. 5A with options data line also shown.

FIG. 6 illustrates, in an embodiment, a formula for calculating an index for a particular mode between two geographic points for a particular time period.

FIG. 11 shows, in accordance with one embodiment, a contract template for allowing a participant to specify a new contract to buy or sell to FutureFreight.

FIG. 12A shows, in accordance with one embodiment, a control panel as seen by the forwarder when transacting futures.

FIG. 12B shows, in accordance with one embodiment, a control panel as seen by the carrier when transacting futures.

FIG. 12C shows, in accordance with one embodiment, a control panel as seen by the carrier when transacting options.

FIG. 12D shows, in accordance with one embodiment, a control panel for trading component segments between the time futures contracts expire and their performance.

FIG. 14 shows, in accordance with one embodiment, the various factors comprising the shipper confidence level (SCL).

DETAILED DESCRIPTION OF PREFERRED EMBODIMENTS

Figure 1A:
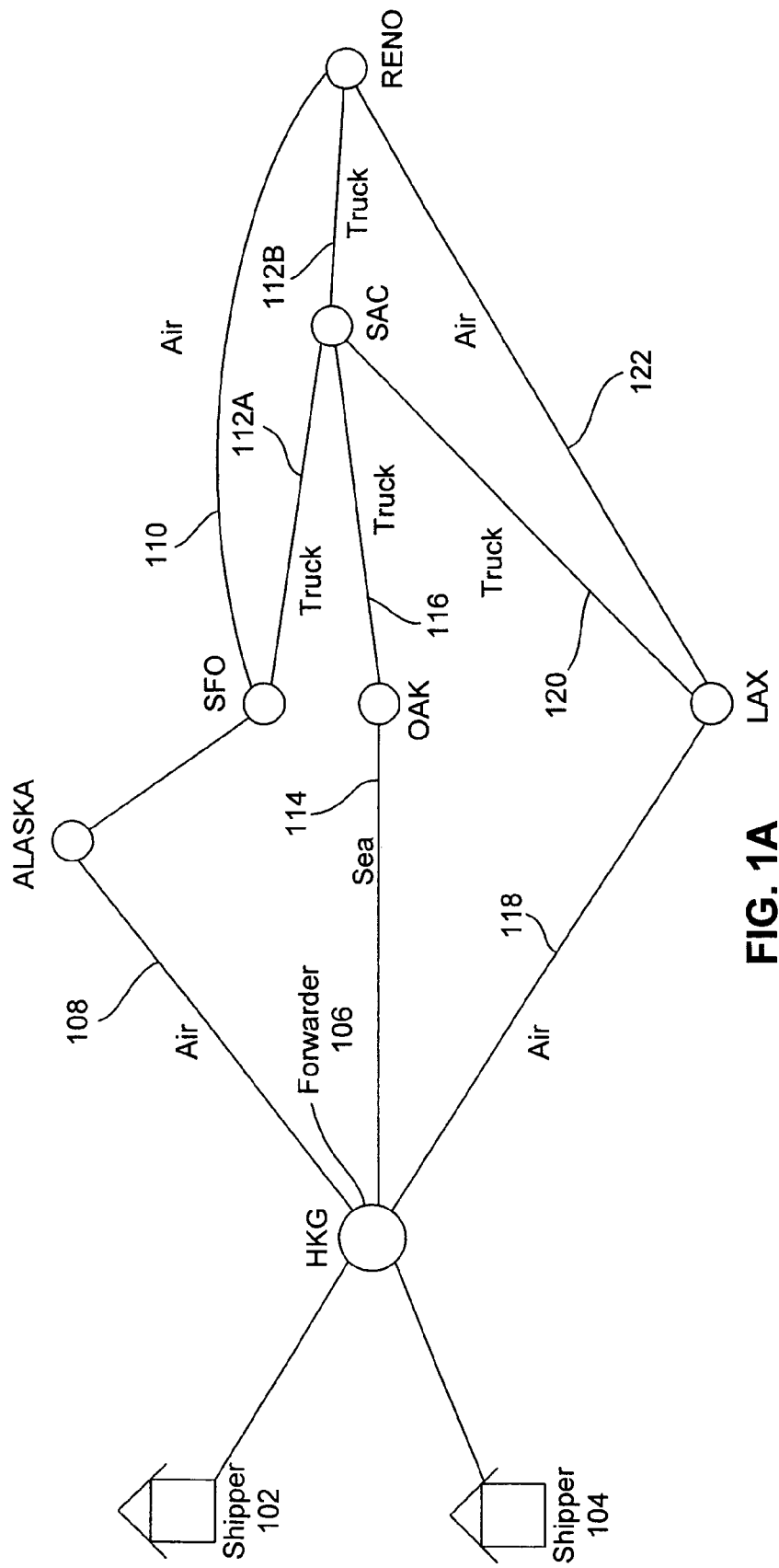
FIG. 1A shows some hypothetical shippers, forwarders, and carriers involved in shipping between Hong Kong (HKG) and Reno, Nev. (Reno) using multiple possible modes and alternate routes.
Figure 1B:
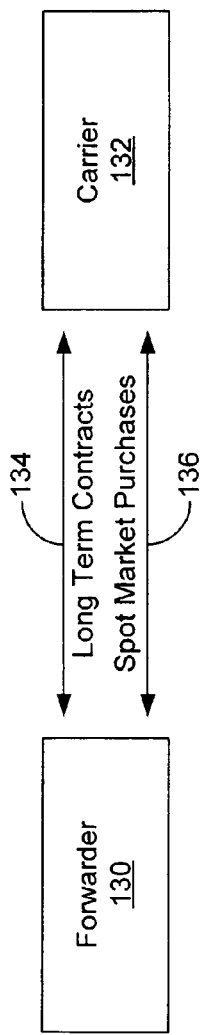
FIG. 1B shows that the relationship between forwarder and carrier, which is governed in part by spot market purchases and long-term contracts.
Figure 1C:
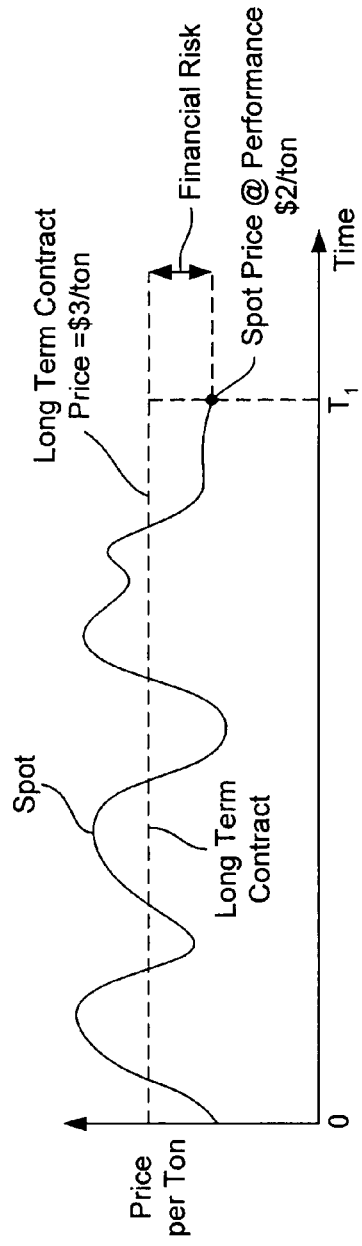
FIGS. 1C and 1D are examples facilitating the discussion of the concepts of pricing risk and capacity risk.
Figure 1D:
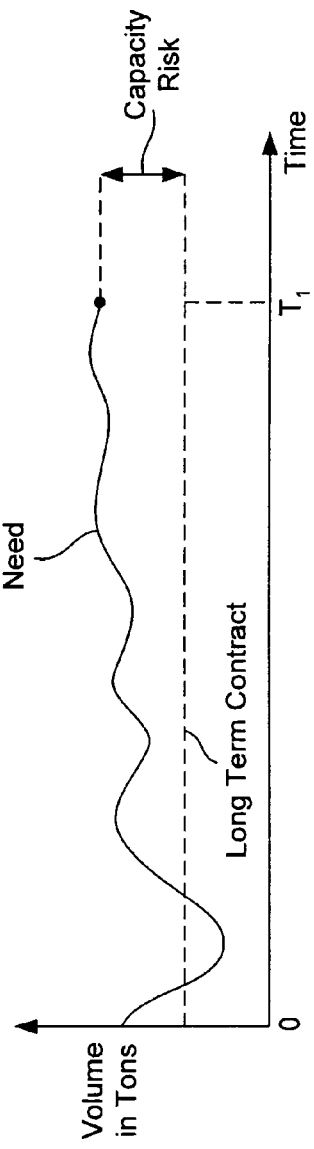
Figure 1E:
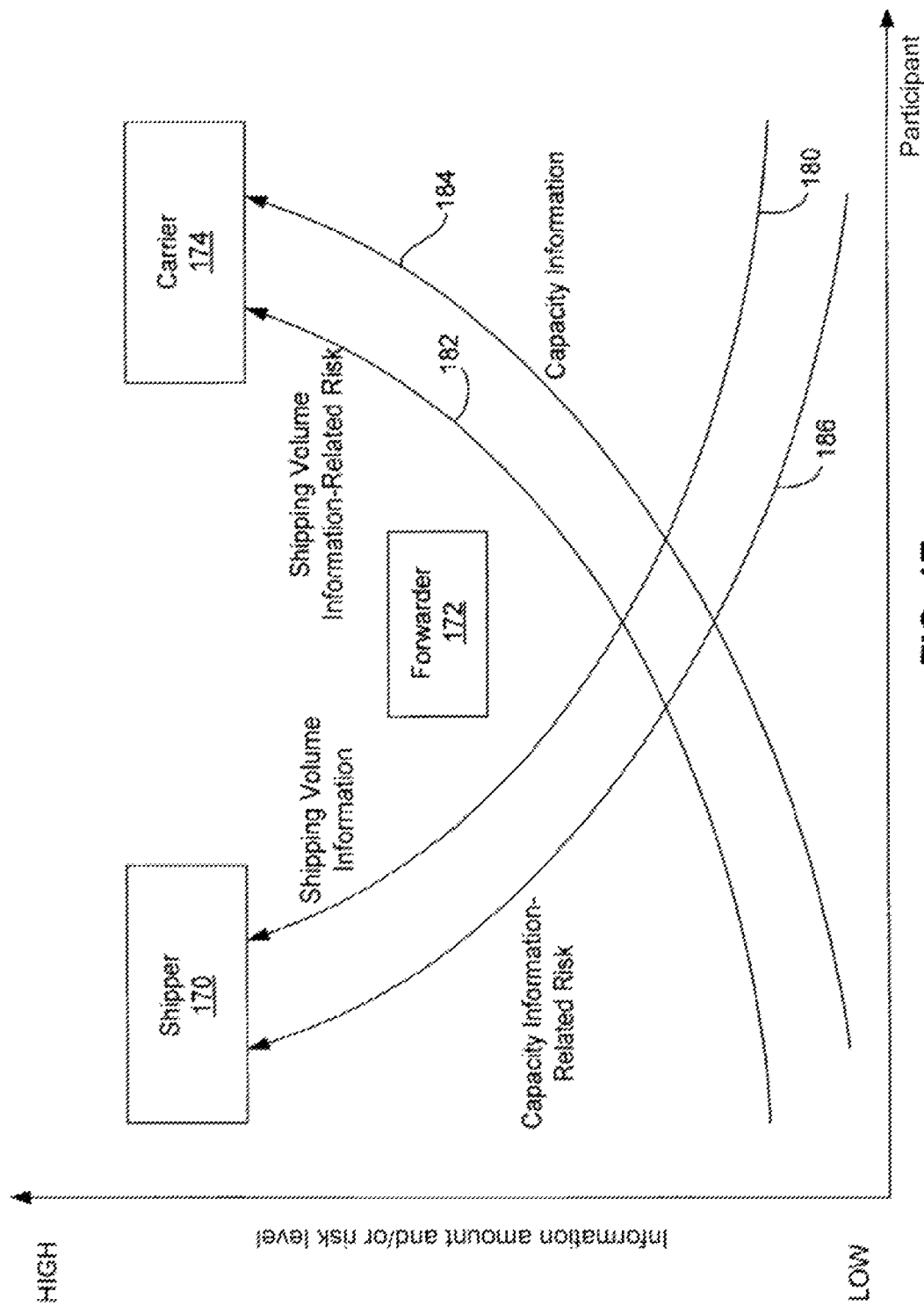
FIG. 1E shows the existing distribution of information and risks among participants.
Figure 2:
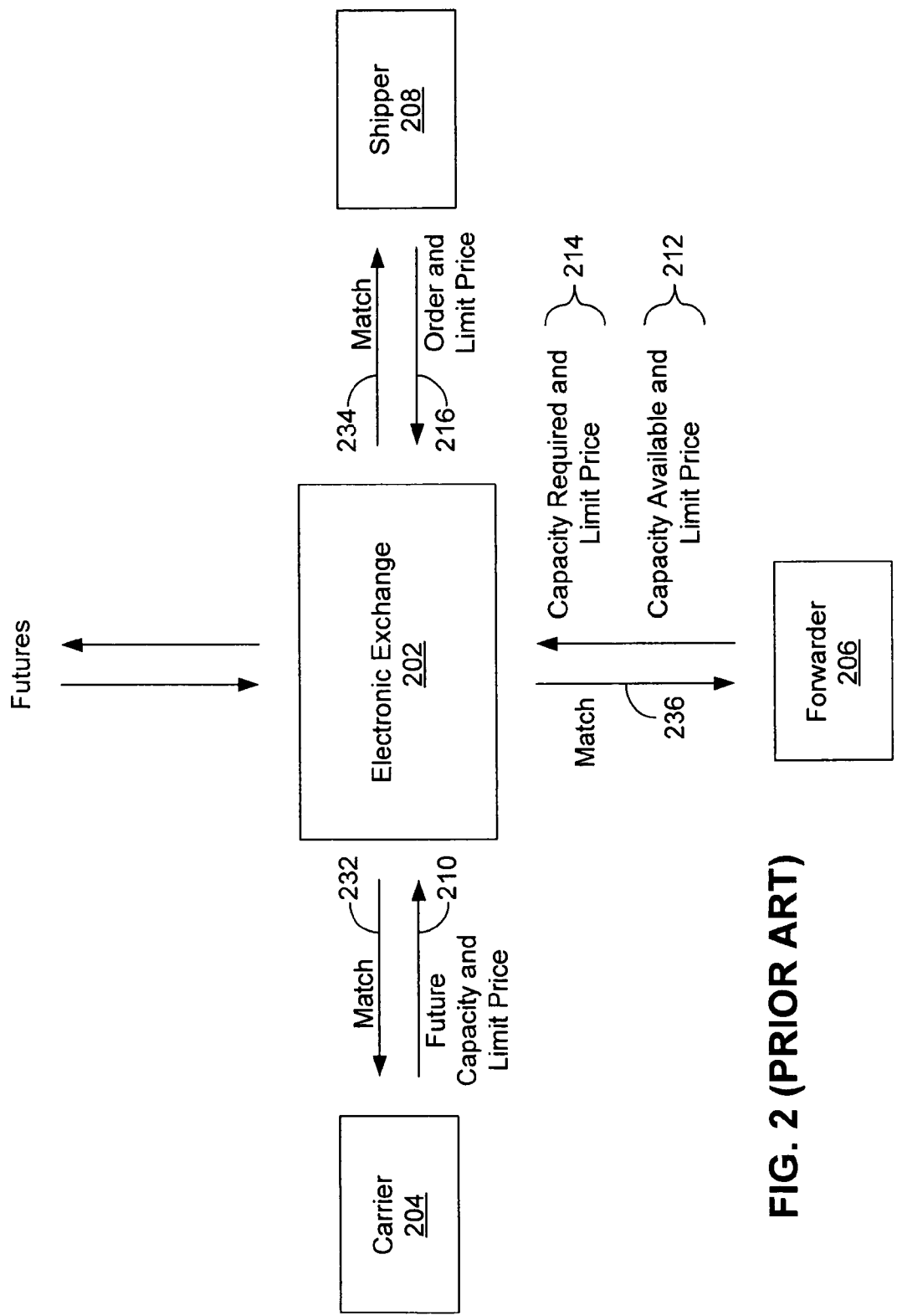
FIG. 2 shows a prior art electronic exchange for facilitating commerce between a carrier, a forwarder, and a shipper.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the present invention, there is provided a networked multi-modal, multi-route freight transaction and trading system (referred to herein as the FutureFreight system or FFS) for allowing shippers, carriers, and forwarders to more efficiently conduct freight-related transactions, as well as allowing market makers to participate more fully in the freight market. The participation by market makers, utilizing the products created by the FFS, improves liquidity in the freight market to the degree heretofore unattainable.

In an embodiment, the FFS takes into account the multi-modal nature of the freight industry and packages orders in such a way that they can be readily fulfilled using one or more transportation modes (e.g., air, sea, trucking, and/or rail). Furthermore, the FFS takes into account the fact that routing between two destination points can be accomplished using a multitude of intermediate shipping points. By taking into account both, the FFS can provide shippers, forwarders, and carriers with more choices to fulfill shipping orders.

To illustrate this point, consider the example of FIG. 1. Unlike the prior art electronic exchange system that can handle only a single mode (i.e., ocean-going bulk as with the Imarex or BalticExchange websites), the FFS takes into account alternative modes when routing between destination points. The various alternate modes (e.g., air versus sea between Hong Kong and San Francisco) increase the number of carriers available to service a particular shipping order, which increases both capacity and competition. Furthermore, the FFS takes into account the fact that routing between Hong Kong and Reno can employ any of the intermediate destinations (e.g., Alaska, SFO, LAX, SAC). The various alternate routes, in combination with the various alternate modes, further increase the number of forwarders and carriers available to fulfill a particular shipping order.

The FFS is well-suited to provide liquidity in the trading of capacity futures. By increasing the number of choices available to fulfill orders, a larger number of future contracts can be created and traded, which enhances liquidity. With improved liquidity, the market functions more efficiently, resulting in potential cost reductions, fairer pricing and reduced risks for shippers, forwarders, and carriers.

In an embodiment, the FFS provides tools for breaking up routes associated with orders into component segments. The component segments can then be bundled to enhance trading. Tools are also provided to assemble the segments into end-to-end routes for performing the contract at the time of contract performance. If any component segment of an assembled end-to-end route is not desirable by the shipper, forwarder, or carrier, that component segment can be traded in the adjustment market trading facility provided by the FFS.

To illustrate this point, consider again the example of FIG. 1. In FIG. 1, if the entire end-to-end route between Hong Kong and Reno is considered an atomic unit for trading purposes, there exists a finite number of Hong Kong to Reno orders for any particular day in the future. This is because Reno is a relatively remote destination, and only a tiny percentage of the shipments that happen daily is expected to be shipped to Reno.

However, if the orders (either buy or sell from any of the participants) can be broken into segments, and with each of those segments considered an atomic unit for trading purposes, there will be a vastly larger number of similar segments to and among various intermediate points. For example, a shipping order between Beijing, China may also traverse Hong Kong and SFO on the way to Salt Lake City, Utah. The Hong Kong-to-SFO segment of this Beijing-Salt Lake City order may be combined with the Hong Kong-to-SFO segment of the aforementioned Hong Kong-Reno order for trading purposes in a larger futures contract between Hong Kong and SFO.

Thousands or millions of orders may similarly be broken up and combined using any combination of modes and intermediate points to create various bundled, tradable futures contracts. Geographic grouping may also be employed to increase the size of the bundles, if desired. For example, a component segment from Hong Kong-SFO may be bundled together with a component segment from Taiwan to Oakland in a East Asia/America West Coast bundle. Time-based grouping may also be employed. For example, component segments serving two destination points (e.g., Hong Kong-SFO) may be bundled if they occur within a predefined or programmable time frame (e.g., 3 days, 1 week, 2 weeks, one month, etc.). There is of course no requirement that component segments have to take place consecutively within the time frame (e.g., first Monday in November and 15$^{th}$ of November can be grouped into the "November" bundle). Additionally or alternatively, both time-based grouping and geographic grouping or bundling (e.g., all component segments from East Asia to America West Coast in the month of March, 2004) may also be employed simultaneously to increase the value in each tradable future contract. Additionally or alternatively, bundling or grouping may be applied to end-to-end freight orders, without having to first breaking the orders into component segments.

With grouping or bundling, the volume in each tradable futures contract increases, which in turn increases its profit potential and attraction to market makers. In this manner, the FFS increases market makers' participation, and in the process improves liquidity as buyers and sellers in the adjustment market can have a better assurance that they can quickly buy, sell, and trade various futures contracts.

Once the futures contracts expire and after the trading phase by market makers is completed, the bundled segments may then be unbundled. As mentioned, the unbundled segments may then be employed to create the complete end-to-end order for booking on the various carriers for performance. An adjustment market mechanism is provided to allow forwarders to trade or exchange undesirable component legs. For example, if a forwarder secures a Taiwan-Oakland component leg as part of a futures purchase but is more interested in a Hong Kong-SFO component leg to service the same East Asia/America West Coast transportation need for a particular freight order, the forwarder may employ the adjust market to perform the trading or exchange after futures expiration.

To further facilitate freight transactions (which may be long-term or spot market) and the trading of capacity futures, the FFS also provides tools to collect shipping volume and shipping capacity data, to qualitatively and quantitatively assess forecasts pertaining to shipping volume and shipping capacity, and to distribute such information among the participants in a confidential, secure manner. Tools are also provided to allow participants to analyze and manage risks. As such, the FFS seeks to reduce the disparity in the amount of information possessed by various participants. With improved information, the participants are able to reduce their pricing risks and capacity risks in employing futures, long-term contracts and spot-market purchases to handle freight shipments.

Figure 3:
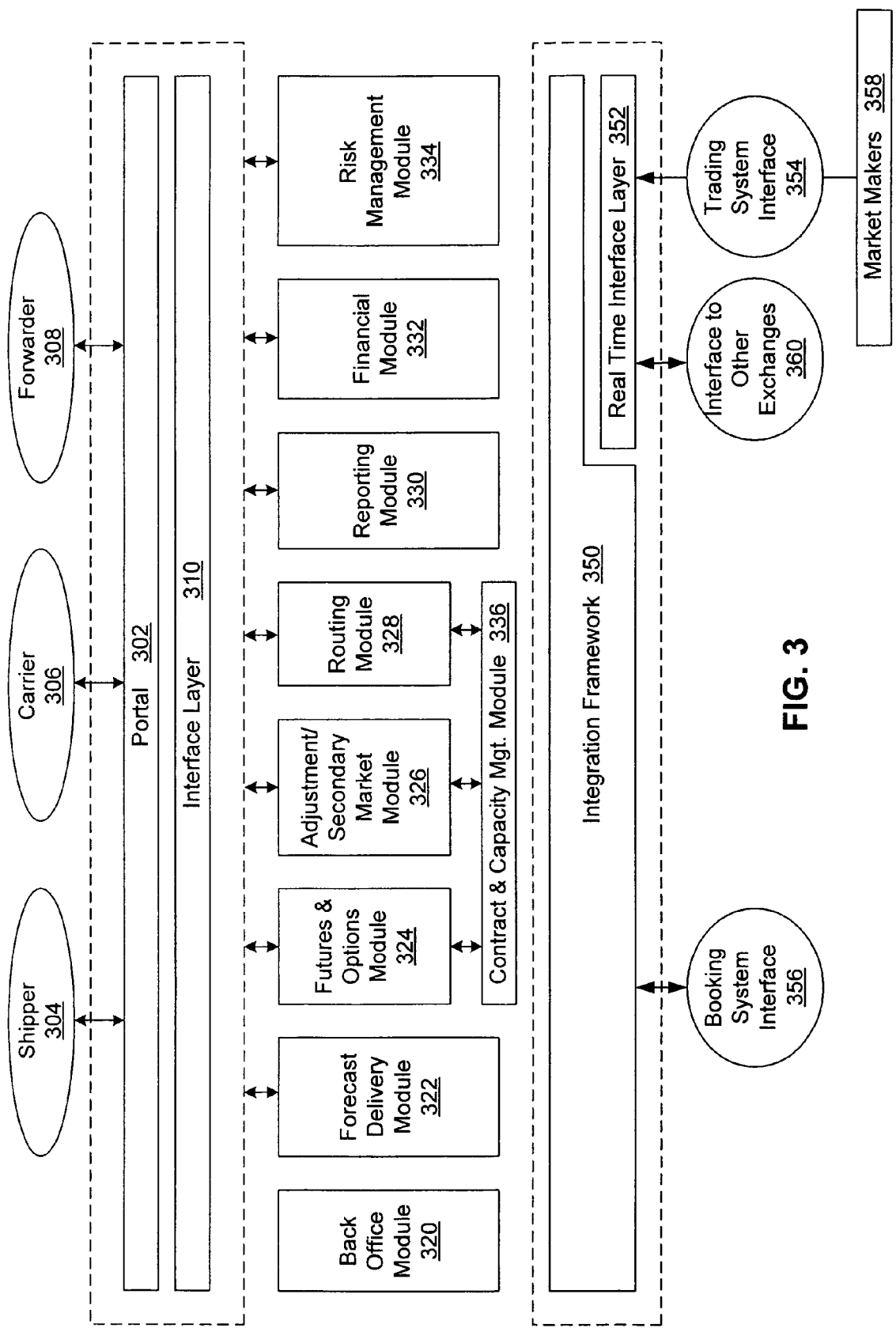
FIG. 3 shows, in accordance with an embodiment of the present invention, a high-level functional architecture of the FutureFreight System.

The features and advantages of the present invention may be better understood with reference to the figures and discussions that follow. FIG. 3 shows, in accordance with an embodiment of the present invention, a high-level functional architecture of the FFS. There is shown a FFS portal 302 through which shipper 304, carrier 306, forwarder 308, and market makers 358 may conduct transactions. FFS portal 302 is typically an Internet Portal and may be implemented via, for example, an appropriate web server.

An interface layer 310, which may be implemented using static (HTML) interface and real-time (applet) interface in an embodiment, facilitates communication between portal 302 and a plurality of backend modules. These modules include, for example, forecast delivery module 322, futures and options module 324, adjustment market module 326, routing module 328, reporting module 330, financial module 332, and risk management module 334.

Forecast delivery module 322 represents the module for collecting the capacity and shipping volume data from the carriers and shippers, respectively. This may include historical data, spot-market data and forecast data regarding capacity and shipping volume (which itself includes origination and destination identification, volume, time frame, any constraints, etc.). The forecast engine then aggregates the data in accordance with the needs of other data consumers, such as forwarders, carriers, or shippers.

For example, a forwarder may wish to obtain forecast data specific to a particular shipper for a particular time frame. As another example, a forwarder may wish to obtain forecast data pertaining to a group of shippers whose goods originate from a particular location in a particular time frame. As a further example, a carrier may wish to obtain forecast data for a particular time frame pertaining to a particular mode, a particular geographic segment, a particular region, etc.

If appropriate, forecast delivery module 322 works in conjunction with risk assessment module 334 to compute the risk associated with the forecast data. In an embodiment, the shipper may be asked to furnish a plurality of parameters (e.g., 8 in one case) that reflect the risk probabilities associated with various aspects of the forecast data. For example, the risk probability parameters may include location, age of project, lane stability, capacity, etc. These risk probability parameters are then aggregated into a single value known as the shipper confidence level, which may then be employed to quantify the risk level associated with the furnished data from that particular shipper. In another embodiment, the historical forecast data from a particular shipper (i.e., forecast data supplied by a particular shipper in the past) is compared with the historical actual shipment data from that particular shipper to determine the extent of the difference between the historical forecast data and the actual shipment data. When taken over many samples, this difference reflects the risk associated with the forecast data from that particular shipper.

Risk associated with a forecast can be computed in several ways. For instance, the provider of the forecast can provide a confidence level, which is his own estimate of the statistical likelihood that the forecast will represent actual shipments. The confidence level can be improved by providing the forecaster with a decision tree that lists the main cause of forecast variability and decomposes the process of estimating the overall confidence level into smaller, easier to estimate confidence levels. The is an inherent limitation to the method for humans when estimating risks (see The Economist, "A Survey of Risk, p5, Jan. 24-30 2004, http://www.economist.com/displaystory.cfm?story_id=2347791). Another approach is to compare historical forecasts with historical actual. This method has the advantage of eliminating the human factors and providing the ability to calculate risks for different time horizons and different levels of aggregation. A two-week forecast issued at three months may contain more or less risks than same forecast at two weeks. Similarly, a two week forecast may for instance, be more risky than a quarterly forecast. A historical approach can more accurately measure these differences and provides an unbiased tool for calculating risks.

The FFS, functioning as a central communication hub, advantageously provides a ready platform for collecting and disseminating such forecast data, which helps the various participants manage risks and the market makers in making more informed trade decisions. In an embodiment, forwarders can see the data from only their shipper customers with written permission. In an embodiment, carriers can only see summarized data across a lane. In an embodiment, data that is not shared is total capacity by carrier and demand by non-customer shippers.

Futures and option module 324 handles the futures and options contract creation, offer, and acceptance by the various participants as well as by market makers 358 via trading system interface 354. Functions handled by futures and option modules 324 include providing forms for filling out orders, accepting posted orders, providing forms for filling out capacity offers, and accepting posted capacity offers. The various orders and capacity postings are then processed by routing module 328 to determine the best routing possible given the requirements of the order (e.g., the nature of the goods shipped, time en-route, shipping mode, price, etc.) and the available capacity.

Routing module 328 also performs the end-to-end routing of orders (as described in 810) to identify the specific flight (air), tariff (truck), schedule (rail), or sailing (ocean) that will be applied to the Futures or Options contract. After routing the orders are sent to the Adjustment Market 326 using the parameters specified by the shippers and/or forwarders. Once the orders are routed, their routes may be broken up into component segments and grouped to create futures and options products that are more tradable.

Once the shipping orders and capacity postings are processed into more tradable futures or options contracts (e.g., combine shipment components from a plurality of small shipping orders into futures contract for 500 tons between two intermediate shipping points), the contracts are transmitted to trading system interface 354 for trading by market makers 358 using an appropriate options and futures trading system.

Once a contract expires, it is ungrouped by adjustment market module 326 and the end-to-end orders are reassembled. Via adjustment market module 326, the segments can be adjusted by trading in the adjustment market. This adjustment market trading allows, for example, a forwarder to trade a 20-ton capacity on United Airlines for a 20-ton capacity on Singapore Airlines since there may exist a more advantageous financial arrangement between that forwarder and Singapore Airlines. In this manner, adjustment market module 326 allows the forwarders (and possibly carriers) to trade on contracts or contract segments with smaller volumes and shorter periods of time as final adjustments prior to contract execution. Since these volumes are generally very small, market makers typically do not participate in the adjustment market trades. Market Module 326 also provides an opportunity for buyers to adjust parameters that are necessary for final execution of a shipment, yet not present in a futures or option contract. For instance, the exact type of container, the ability to deliver bulk freight (vs. freight that has been put into a container), the exact position aboard a vessel, special handling for perishable or dangerous goods. These last minute parameters may require a surcharge (or a discount) from the carrier which can be negotiated through the adjustment market.

Reporting module 330 performs compiles and provides various reports for shippers, carriers, forwarders, and market makers. For market makers, for example, reporting module 330 may provide data regarding how many contracts were traded, how much money was gained (or lost), what futures and/or option contracts one current holds, and the like. At the time of settlement, reporting module 330 works in cooperation with financial module 332 in order to perform the settlement and clearinghouse functions as well as other financial functions (such as checking the creditworthiness of the trading participants or deducting FFS administrative fees from the proceeds from trading).

As shown in FIG. 3, there exists a contract and capacity management module 336, which interfaces with futures and options module 324, adjustment market module 326, and routing module 328.

The Contract and capacity management module 336 can be used by Forwarder and Carriers to strategically position their capacity. For instance a carrier may want to establish rules to automatically release or retract capacity depending on market status. Such a rule could be the retraction of unsold capacity when price variations indicate that spot market prices should be higher than previously thought. In a similar fashion, Forwarders can establish rules such as the decision to cover an increased percentage of the forecast as time nears expiration when future prices are lower than that of their long term contracts.

Integration framework 350 is a layer of integration software whose role is to take information from futures and options trading and provide signals for operational activities. For example, providing enough data so that a Forwarder can book freight and generate an Air Way Bill.

Real time integration layer 352 allows external systems to interact with the FFS on a real-time or near real-time basis. For example, both the Trading System Interface 354 and the Interface to other exchanges 360 are coupled to the FFS via the real time integration layer 352. Interface to other exchanges 360 represents the interface to external exchanges, to allow FFS users ready access to other financial exchanges, such as other commodities exchanges. This aspect is discussed later here.

Trading system interface 354 represents the interface to external futures and option trading systems, which allows market makers 358 to trade on the options and futures generated by futures and options module 324.

Booking system interface 356 represents the interface to external carrier booking systems, which performs the actual bookings of capacity on flights, ships, trucks, and railway cars. These actual bookings are then executed by the carriers at the time of contract performance. Booking System Interface 356 couples with integration framework 350 (either directly or through real time integration layer 352).

There is also shown back-office module 320 for handling back-office, system-support type operations. For example, account login management and security settings, confidential policy implementation, and help desk may represent functions implemented by back-office module 320.

Figure 4A:
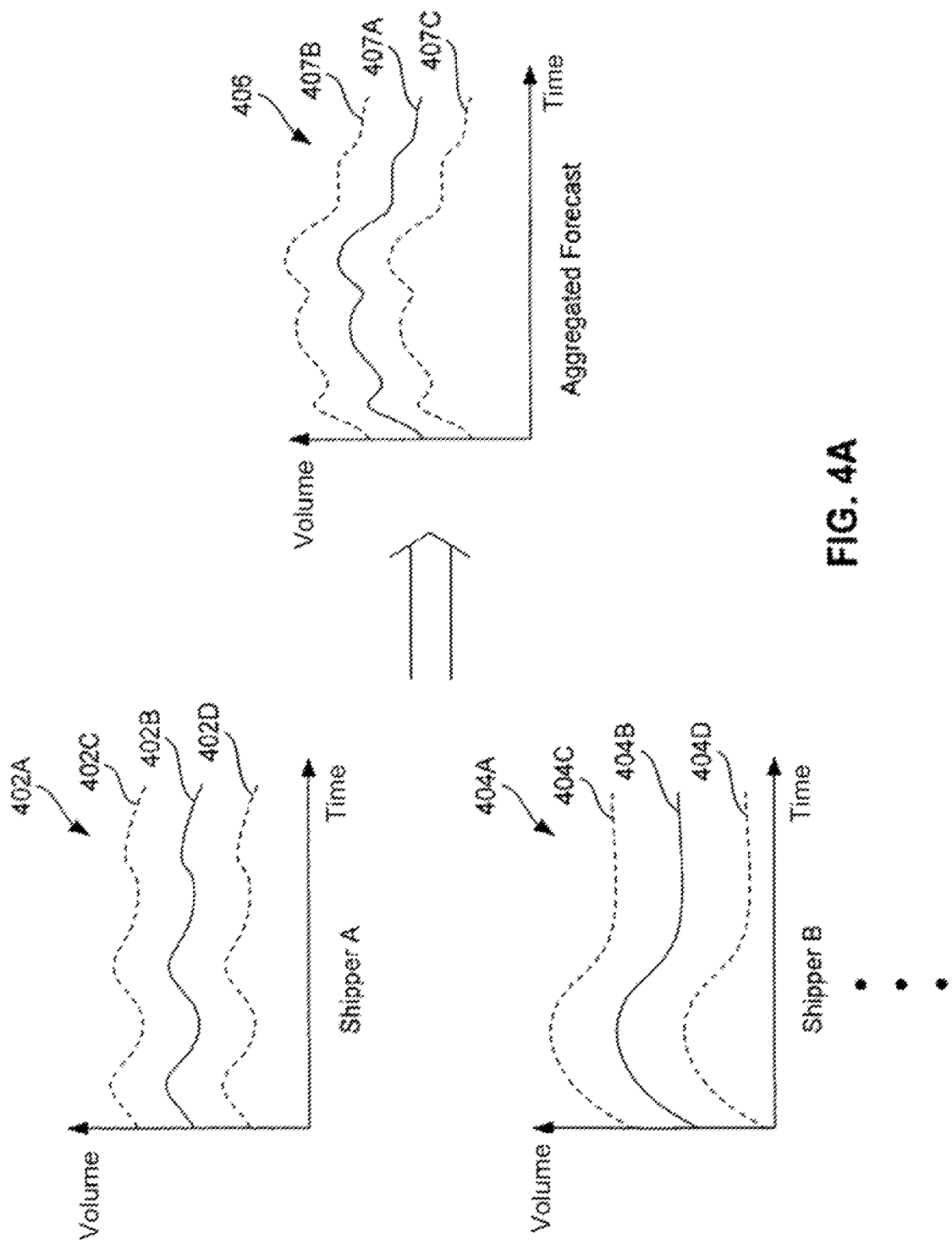
FIG. 4A shows exemplary forecasts from individual shippers over a period of time for a particular end-to-end route.
Figure 4B:
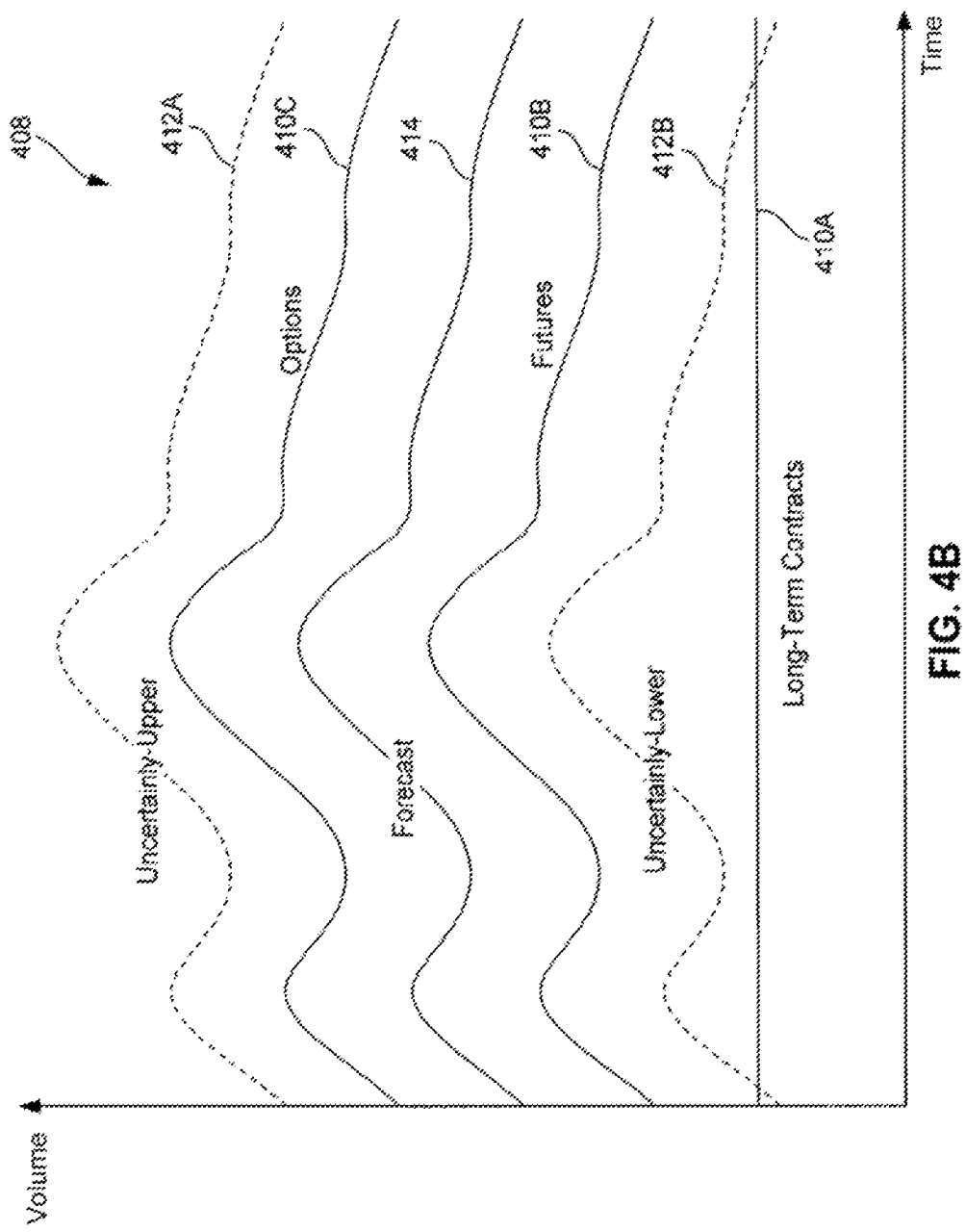
FIG. 4B is a chart showing an exemplary mix of long-term contracts, futures, options, and spot market purchases that may fulfill the shipping needs forecasted as a function of time.

FIGS. 4A-4C show how forecasts and other factors influence the determination by a forwarder of how much capacity to contract for and at what price. In FIG. 4A, graphs 402A and 404A show some of the forecasts from individual shippers over a period of time for a particular end-to-end route (e.g., Hong Kong to Reno for May 2004). Generally speaking, the forecasts are sorted by relevant shipping parameters (e.g., bulk versus container versus liquid, permissible time-en-route ranges, etc.). These forecasts include the actual forecast data provided (402B and 404B) as well as the band of uncertainty or risk associated with the data (402C-402D and 404C-404D). This band of uncertainty is computed by applying the shippers' aggregate forecast rating and reflects the likelihood that the actual shipping capacity would fall into the band given a certainty percentage. In one example, the risk may be quantified by an 80% certainty that the actual capacity would fall within the bands.

These individual forecasts are then aggregated into an aggregated forecast 406. In chart 406, there are included the forecast 407A, as well as the band of uncertainty or risk, which are marked by reference numbers 407B and 407C. In an embodiment, the aggregated forecast covers the end-to-end route (e.g., Hong Kong to Reno). In another embodiment, the individual forecasts are broken up into segments, and the aggregated forecasts are then specific to segments of the journey. Taking the aforementioned example of shipping from Hong Kong to Reno, one of the aggregated forecasts may cover shipping needs from all electronic manufacturers for the month of May 2004 between Hong Kong and San Francisco (an intermediate point). In another embodiment, the aggregated forecast may be further classified according to transportation mode (e.g., ocean shipping from all electronic manufacturers for the month of May 2004 between Hong Kong and San Francisco).

From aggregated forecast 406, chart 408 of FIG. 4B may be ascertained to allow the forwarder to ascertain the right mix of long-term contracts, futures, options, and spot market purchases that would most likely fulfill the shipping needs forecasted by the shippers. In chart 408, line 410a represents the volume of shipping to be filled by long-term contracts; line 410b represents the volume of shipping to be filled by futures; line 410c represents the volume of shipping to be filled by options. Line 412a and line 412b represent respectively the upper and lower boundaries of the band of uncertainty, while line 414 represents the forecasted volume.

Long term contracts tend to be the least flexible. Thus the volume of shipping to be satisfied via long-term contracts, represented by the area under line 410a, lies almost entirely within the area under line 412b. That is, the volume of shipping purchased pursuant to long-term contracts is mostly outside of the band of uncertainty, which has a lower boundary 412b. In so doing, there is a strong likelihood that all the capacity purchased by long-term contracts will be filled.

Futures can be employed to satisfy the shipping needs that are not filled by long-term contracts. Note that the volume of capacity purchased pursuant to futures is typically much lower than the forecasted volume, rendering it highly likely that the volume of capacity purchased pursuant to futures contracts will be filled, even if the actual volume to be shipped is below the forecasted volume (line 414).

Option contracts tend to be more expensive than future contracts for a particular volume of shipping. Accordingly, options are employed to satisfy the volume of shipping that is not satisfied by a combination of long-term contracts and futures. With reference to FIG. 4, the options volume is depicted by line 410c. Note that the volume of shipping purchased pursuant to option contracts is slightly below the upper boundary 412a of the band of uncertainty, rendering it more likely than not that the volume of shipping purchased pursuant to option contracts will be utilized.

If the forwarder needs more capacity at the time that the shipping order from the shipper is performed, spot market purchases can be made. Note that the forwarders can employ pricing data from the option and/or futures contracts in order to predict the spot market purchase price at any given point in time. For example, forwarders may employ the well-known Black-Scholes formula in order to predict spot-market pricing.

Chart 430 of FIG. 4C shows how the capacity requirement of a given shipping order from a shipper can be fulfilled by a mix of long-term contracts, futures contracts, option contracts, and spot-market purchases using the risk management tools provided by the FFS.

In an embodiment, a forwarder's determination of price and volume to purchase depends on a variety of factors. These factors include the aggregation of shippers' forecasts data (which may be limited by geography, time, shipping mode, etc.), any previous futures and/or option contract purchase, existing long-term contracts, price discovery (e.g., using the Black-Scholes formula), risks attributable to capacity forecasts by shippers, etc. With these factors, buyers and sellers of freight futures can determine what price and volume to set for their freight futures and options contracts. For example sellers can determine whether to issue more contracts and at what prices—and should it be at a market price or limit price. Sellers can determine whether it is a good time to release capacity slowly over time, and how long to wait before releases and at what price (iceberg orders). Buyers can determine the highest price they may want to pay for a lane, or whether to just issue a market order. Buyers can determine if it would be advantageous to over buy and re-sell some of the contracts and at what price and time.

Carriers also need accurate forecast information from shippers in order to determine the volume of shipping released for trading over time. Since pricing of any commodity is related to the demand-supply relationship, an excessive supply of capacity at any point in time has a tendency to depress price. To obtain high pricing, carriers desire to release sufficient capacity to meet, or nearly meet forecasted demand. FIG. 5A is a chart showing the relationship between time and capacity released, as measured by the number of futures contracts sold, for any particular segment. At time t=0, the futures contracts for that particular segment for the time frame in question is released for trading. At time t=t1, the futures contracts expire. At this time, market makers would have settled their futures contracts for cash and the futures contracts are unbundled by the adjustment market module 326 in order to match a futures contract to a specific flight number and ultimately forms an end-to-end route to service the pending orders. Further, the segments may be traded by forwarders or carriers via adjustment market module 326 to adjust for any preference. At some later time, contract performance takes place and the goods are actually loaded on the appropriate transportation apparatus to be sent to the destination.

In chart 502, line 504 shows the forecast demand for futures contracts, as ascertained from capacity forecast data obtained from shippers. The demand increases over time since the number of futures contracts sold tend to increase as the date of expiration is approached. Line 506 shows the demand curve formulated by the shipper for timing the release of futures contracts after other factors have been ascertained.

At any given point in time along the time axis (x axis), the carrier considers not only the data from the shippers but also the existence of any futures contracts that the carrier may have re-purchased if they oversold, any existing long-term contract for capacity (which reduces the demand), the risk factor assigned to the shipper's forecasts. The Risk Factor is assigned by using a statistical function based on variance between forecast and actual at regular intervals; this is done on a per location/customer basis; and aggregation is done on a customer level and by geography.

Another factor includes price discovery using the Black-Scholes formula. All these factors are taken into account in deriving line 506, which governs the capacity released and the price set by the shipper.

FIG. 5B depicts an analogous graph as FIG. 5A with options forecast data shown. In FIG. 5B, line 554 represents the forecasted demand for futures and options, with line 558 represents the forecasted demand for options alone. Line 556 shows the demand curve formulated by the shipper for timing the release of futures contracts after other factors have been ascertained.

In accordance with an embodiment of the present invention, mode-specific indices are created for various segments to facilitate trading and to improve liquidity in the adjustment market. An index is a weighted price average (e.g., by weight) of all shipments for a particular mode (e.g., air, ship, rail, truck) between two geographic points during a period of time. An index may be used as a reference for pricing purposes, may be employed by market makers to trade, or may even serve as an instrument of trade. Indexes can be used to mitigate risk. For instance if a forwarder has a contract with a shipper that references a fixed price of $1.5/kg, he may purchase an option to sell the index should the index get higher than $1.5/kg. The forwarder's gain will be the difference between the index and $1.5 should the Index be above $1.5/kg. If prices go above $1.5/kg, any loss incurred on the shipper's contract will be recovered by selling a corresponding amount of index contracts, thus guaranteeing the forwarder a no loss transaction.

For the purpose of defining an index, a geographic point may be as general as a region of the world (e.g., South-East Asia), a country (e.g., Japan), a city, a specific airport, a specific shipping port, a city, a trucking terminal or the like. FIG. 6 illustrates, in an embodiment, a formula for calculating an index for a particular mode between two geographic points for a particular time period. In FIG. 6, v represents all shipments for a given mode between a pair of geographic points over a particular time period T. could be:

An illustrated example of index calculation for trucking between SF and Reno could be: . . .

$$\frac{\sum_{Transaction\,over\,a\,region,\,time\,period} Price * Weight}{\sum_{Same\,domain} Weight}$$

Where T is a time interval (ex one week) and C is the set of trucking companies trading capacity during T between San Francisco and Reno.

The FFS enhances liquidity in the shipping marketplace and facilitates trading through many innovations. One of the innovations discussed earlier involves breaking up end-to-end route into segments and combine segments from different end-to-end routes into a bundle of segments. By grouping similar legs together, the volume can be increased for each futures contract, which makes trading worthwhile for market makers. Furthermore, grouping has the function of reducing the different trading products (i.e., contracts for the myriads of end-to-end route combinations, some into remote destinations with few contracts per week) into a smaller set (i.e., contracts for bundles of segments). The combination of a smaller set of tradable products and higher volume in each product category stimulates interest on the part of the market makers.

Figure 7:
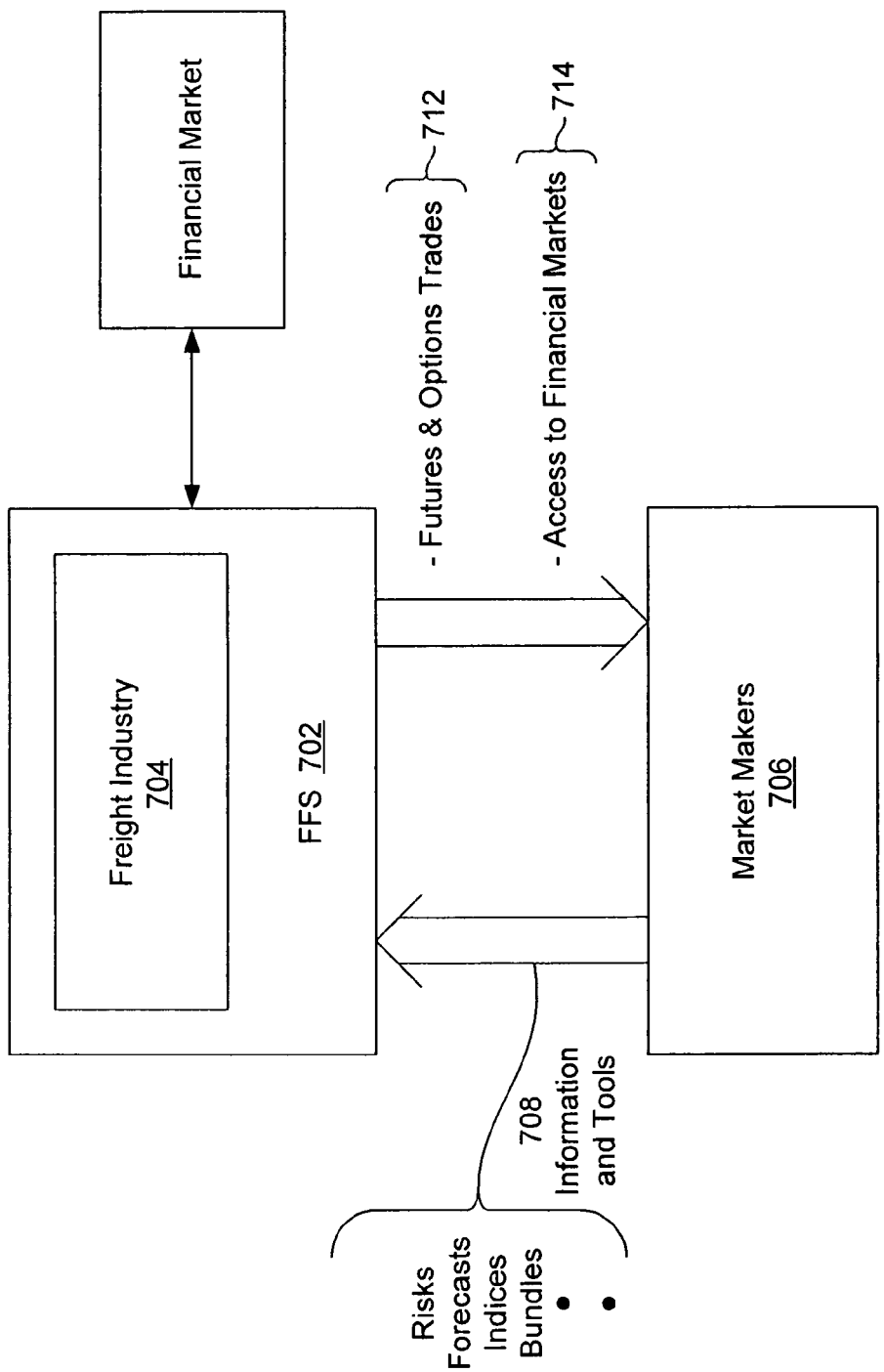
FIG. 7 conceptually show, in accordance with an embodiment of the invention, how the FFS facilitates and encourages trading in capacity futures.

FIG. 7 conceptually shows, in accordance with an embodiment of the invention, how the FFS facilitates and encourages trading in capacity futures. As seen in FIG. 7, the FFS 702 works with all participants of the freight industry 704 to create tradable futures contracts by bundling. These capacity futures and capacity options contracts are then employed by market makers 706 for trading. This is shown by reference number 712 in FIG. 7.

Not only does the FFS create the futures and options contracts for trading, the FFS also provides information and tools (708) to allow market makers to ascertain the pricing and risks associated with the futures contracts created. Risk assessment assigns a reliability rating to the information offered, which allows market makers to more intelligently assess the trustworthiness of data.

Pricing indices, each of which is particular to a specific mode between specific geographic points and over a specific time period, are also offered. Further, forecasts regarding different factors that may influence shipping capacity and pricing (e.g., fuel, labor, weather, road construction, tourism patterns, etc.) are also offered to the market makers to assist in the futures contract evaluation process. The convenience of these evaluation tools greatly assists the market makers in trading in the capacity futures contracts, which enhances liquidity.

Furthermore, the FFS provides ready access 714 to the financial markets (e.g., option and futures markets in other commodities) to allow market makers to manage risks. Such access allows a market maker to hedge against unfavorable price movements, for example. Suppose that a market maker bought a futures contract that specifies shipping by air between Hong Kong and Alaska at $1.50 per ton to commence on Sep. 5, 2004. Suppose that when the market maker needs to sell, the spot market price for that leg is $1.40 per ton, due to reduced fuel cost. In this case, the market maker could have insulated himself from this risk by buying an option in the fuel market that would allow him to profit by $0.10 if fuel price drops. By providing ready access to financial markets to enable market makers to minimize the pricing risks associated with capacity futures trading, the FFS makes trading in capacity futures more attractive to market makers, thereby encouraging trading and enhancing liquidity.

Another way that the FFS encourages trading is by making futures contracts available for all the modes, and provide both mode-independent and mode-dependent information and analytical tools to allow market makers to compare, analyze, and assess all the future contracts. Consider the shipping of goods between San Francisco and New York, for example. For this route, the goods may be shipped by air, by trucks, by railway, or by sea. If shipping via one of the modes is impacted (e.g., the closure of the Panama Canal, which impacts shipment by sea), the capacity demand will change for the other modes and thus their pricing will change. By having futures contracts for all modes and supporting information and tools available at their fingertips, the FFS truly offers a comprehensive trading environment that allows market makers to capitalize on changes in the shipping market place and/or minimize the risks created by the changes.

Figure 8A:
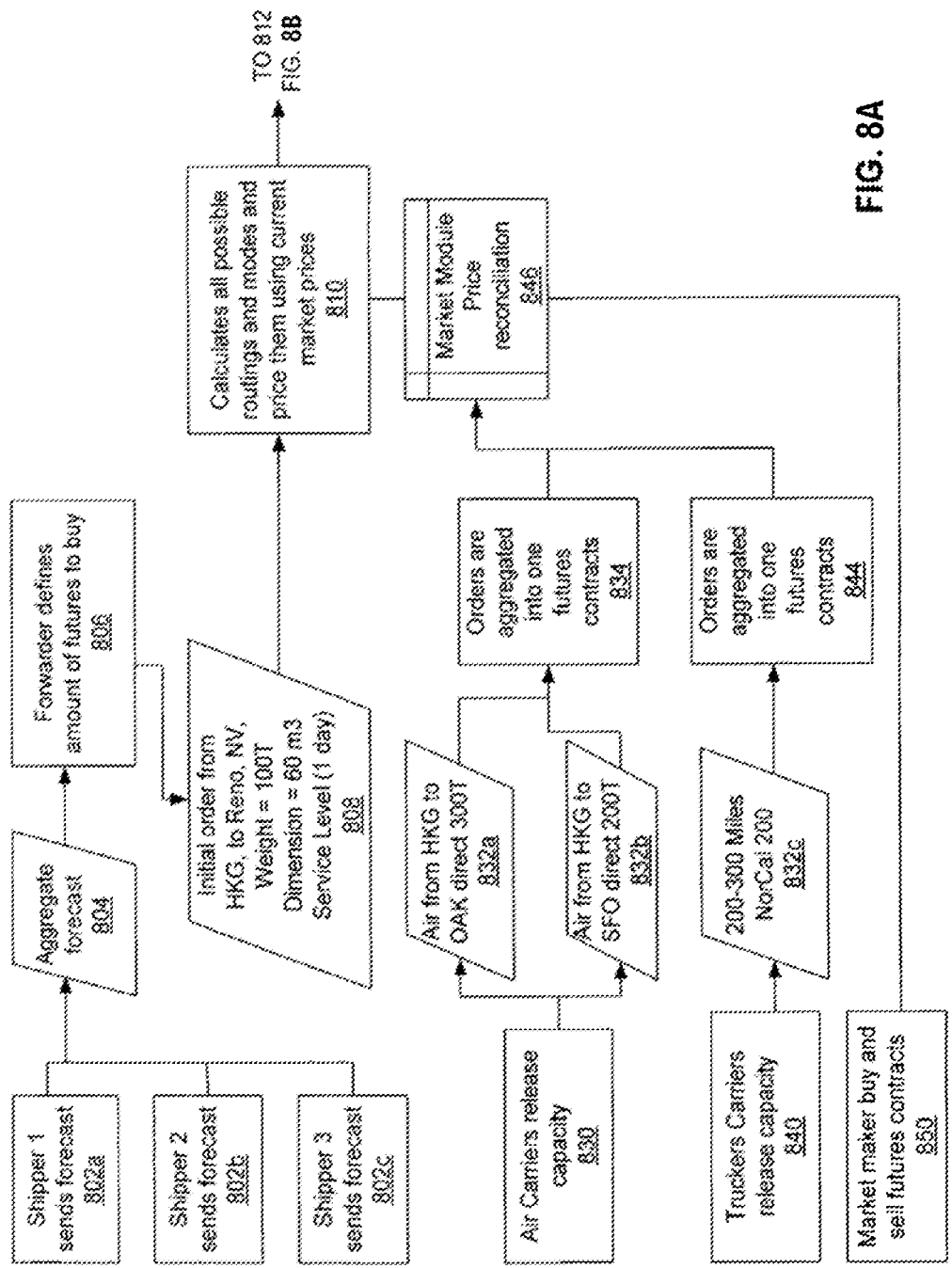
FIGS. 8A, 8B, and 8C show, in accordance with one embodiment of the present invention, how the FutureFreight system fulfills a hypothetical Hong Kong-Reno multi-modal shipping order with the participation of all participants.
Figure 8B:
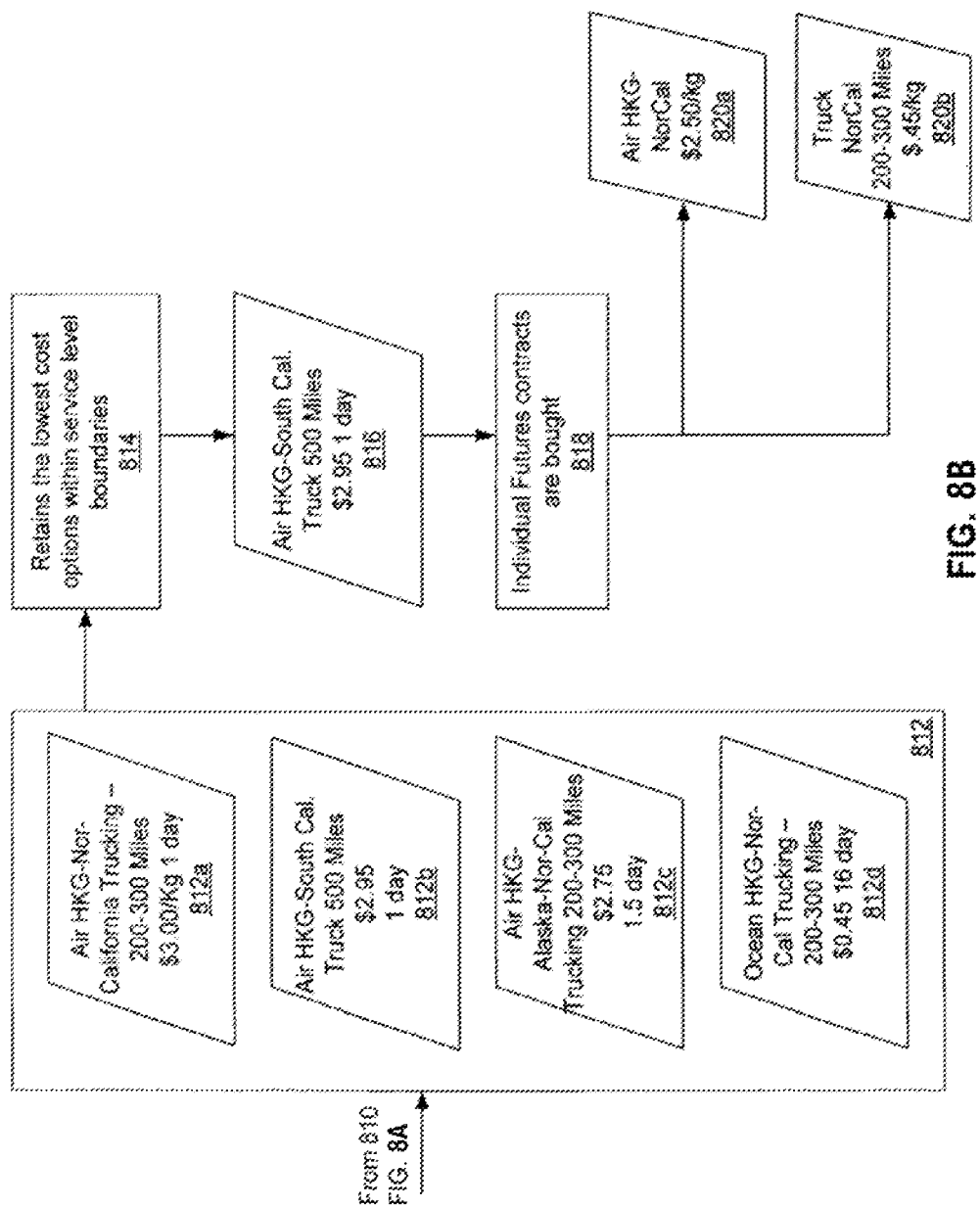
Figure 8C:
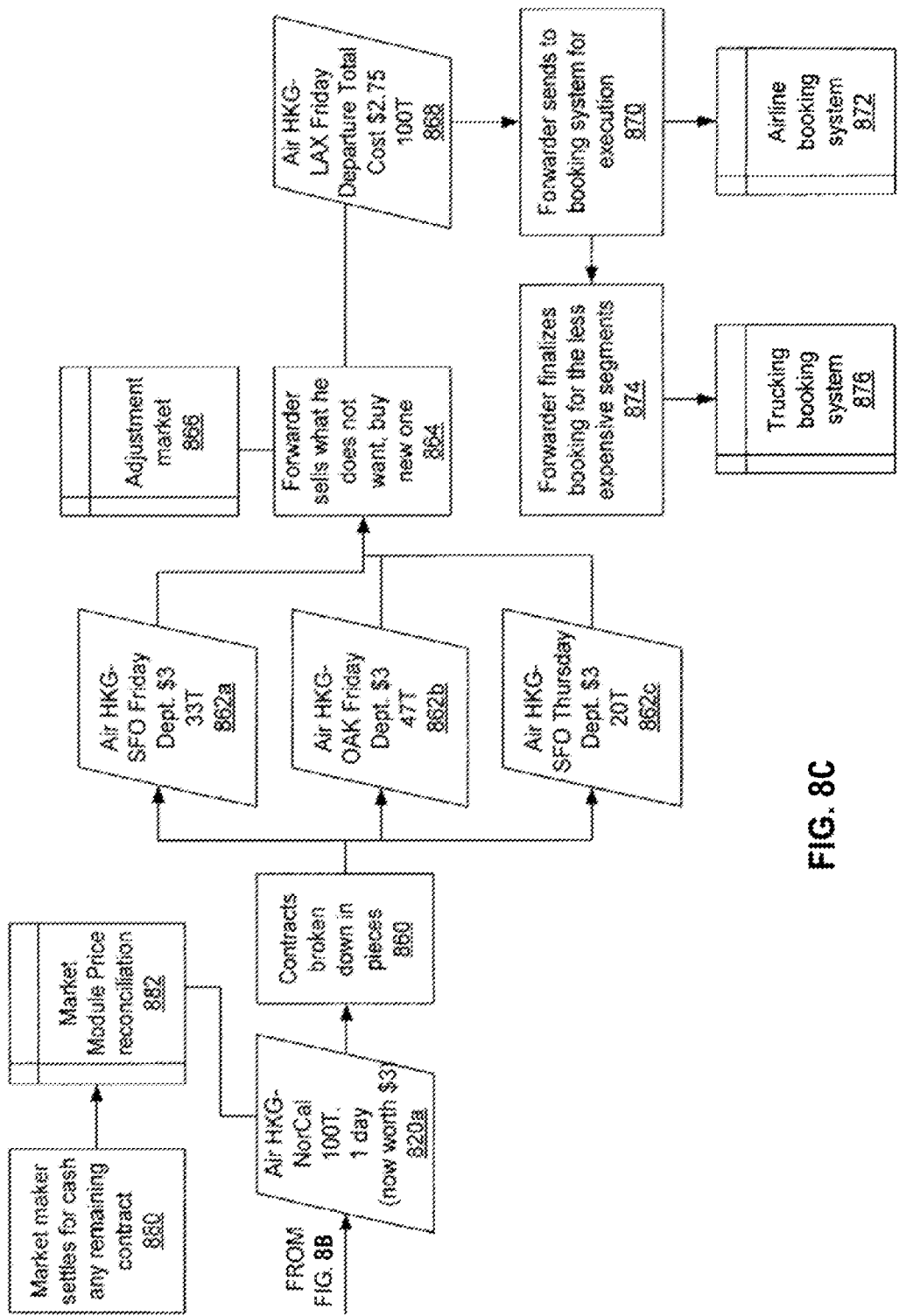

FIGS. 8A, 8B, and 8C show, in accordance with one embodiment of the present invention, how the FutureFreight system fulfills a hypothetical Hong Kong-Reno multi-modal shipping order with the participation of all participants. Note that not all shipping orders will require the participation of market makers and/or the use of the adjustment market. However, the sequence is discussed here to facilitate understanding. Shipper forecasts 802a, 802b, 802c represent forecasts furnished by shippers utilizing the Hong Kong shipping terminal. The forecasts may be for any length of time. In this case, the forecasts cover, for example, for 12 months and may even be furnished with different levels of granularity (e.g., broken down by monthly or quarterly). The forecasts are aggregated into an aggregate forecast (block 804).

The aggregated forecast data allows a forwarder to decide on the amount of futures that the forwarder wishes to purchase (806). With reference to FIG. 4B, the amount of futures purchased is shown by line 410b. In the present example, the amount of futures that the forwarder wishes to purchase (block 808) pertains to 100 tons of shipping, with a dimension of 60 m3 and a service level of one day from Hong Kong to Reno during some specified time period (e.g., first week of November 2004). In block 810, FutureFreight calculates all possible routings and modes and price these using current market prices.

The calculation in block 810 for all possible routes and modes to fulfill a particular futures purchase request by a forwarder employs futures data released from, for example, the air and truck carriers. The air carrier (830) releases, in this example, two blocks of capacity 832a and 832b for purchase by forwarders as futures. Capacity block 832a states, for example, that there is air capacity from Hong Kong to Oakland (an airport in Northern California) for 300 tons at a price of no less than $2.00/Kg on Friday in the first week of November 2004. Capacity block 832b states, for example, that there is air capacity from Hong Kong to SFO (an airport in Northern California) for 200 tons at a price of no less than $2.30/Kg on Friday in the first week of November 2004. These blocks of capacity 832a and 832b are aggregated (block 834) by FutureFreight into an air futures contract for trading.

Similarly, truck carriers 840 may also release their capacity (block 842) for sale to forwarders. The various capacity blocks released by various truck carriers are aggregated into a futures contract for trading by market makers (844). These various futures contracts are managed (block 846) by the Futures and Options Module in the FutureFreight system, which is shown by reference 324 of FIG. 3 in one embodiment. Although only one air futures contract and one truck futures contract are shown in FIG. 8A (as aggregated in blocks 834 and 844), it should be understood that the FFS is capable of managing any number of bundled future contracts for trading by the market makers. The bundled future contracts may be bundled in accordance with, for example, geography, location, route, mode, time frame, service level, and the like.

Four possible combinations are shown in blocks 812a, 812b, 812c, and 812d. These combinations are extracted from the bundles of futures contracts made available for trading by the FFS. Each of these combinations includes, as shown in representative block 812a, route/mode data (e.g., air from Hong Kong to Northern California and then trucking from Northern California to Reno) as well as pricing data (e.g., $3.00/Kg) and service level data (e.g., 1 Day). FutureFreight will then reconcile buy and sell orders based on buyer/seller neutral and fair trading rules within, for example, the service level and price boundaries. Examples of such trading rules include first-come-first-serve, bid-ask algorithms, and/or other neutral/fair trading rules that have been developed for other types of futures markets. The route/mode combination of block 812b is selected due to this transaction being acceptable (price and service level) to buyer and seller (block 816).

Note that the example of FIG. 8 assumes that all component legs can be satisfied (partially or wholly) using futures. In some cases, some shipment orders may involve one or more component segments for which there are no existing futures contracts to fulfill. In this case, FutureFreight may allow the fulfillment of those component segments using a spot-market purchase arrangement, a long-term contract arrangement, and/or other non-futures (or non-option) arrangements.

In block 818, the individual future contracts for the bought. In this case, since two different routes and modes are employed, two different futures contracts would be bought. The first futures contract covers the air portion from Hong Kong to Southern California for $2.50/Kg (block 820a) and the second futures contract covers the trucking portion from Southern California to Reno for $0.45/Kg (block 820b). The result is the selection of the combination shown in block 812b.

As mentioned, the aggregation of various orders to sell capacity into a larger bundle for futures trading (as is done in block 834 for air and block 844 for trucking) increases the attractiveness of futures trading for market makers, which enhances their participation and thereby improves the liquidity of futures trading. Although the aggregated futures contract is traded as a single unit, FutureFreight makes the information regarding a futures contract's constituent capacity blocks available to traders if such information is desired for trading purposes (e.g., a trader can ascertain via FutureFreight that an air futures contract from Hong Kong to Northern California involves 30% shipment from Hong Kong to SFO, 20% from Hong Kong to San Jose, and 50% from Hong Kong to Oakland).

Market makers (850) seek to earn trading profit by buying and selling these futures contracts up to the time of their expiration, also using the FutureFreight's Futures and Options Module (also known as Market Module Price Reconciliation). As mentioned, FutureFreight also facilitates the trading of index futures, allowing market makers to trade based on the daily, weekly, or monthly index (e.g., weighted mean or mean of high-and-low) of futures contracts.

Upon the expiration of the futures contracts, the purchased futures contract(s) may be broken down in order to be traded on the adjustment (i.e., secondary) market and eventually booked on carriers. In FIG. 8C, the air futures contract of block 820a (which the forwarder bought in FIG. 8B) is broken down by FutureFreight (block 860) into the constituent capacity blocks, representing subsets of the actual capacity blocks provided by the air carriers (such as in blocks 832a and 832b). This reverses the process described earlier in connection with blocks 832a, 832b, and 834. At this time, the forwarder has bought, as shown in block.

Note that due to the trading activities of market makers and/or other participants, the air futures contract 820a now has a current market value of $3.00/Kg. This price is determined, in one case, when the market maker employs the Futures and Options Module to settles the expired contracts for cash (blocks 880 and 882). Further, last minute and day trading by any trader also affects pricing. The transfer price could be the last trade or and average during the last trading session, or another method.

In this example, three constituent capacity blocks are involved: 862a, 862b, and 862c. Capacity block 862a covers a 33-ton air shipment from Hong Kong to LAX for a Friday departure in the first week of November 2004 with a price of $3.00/Kg. Capacity block 862b covers a 47-ton air shipment from Hong Kong to San Diego for a Friday departure in the first week of November 2004 with a price of $3.00/Kg. Capacity block 862c covers a 20-ton air shipment from Hong Kong to LAX for a Thursday departure in the first week of November 2004 with a price of $3.00/Kg.

In block 864, the forwarder may view the purchased constituent capacity blocks and trade or exchange the undesirable constituent capacity block(s) on the adjustment market (866). For example, a forwarder may decide that he does not wish to keep purchased capacity block 862c since that capacity block involves a Thursday departure, whereas other capacity blocks 862a and 862b involve a Friday departure as shown.

In the adjustment market, FutureFreight may publish the price of capacity block 862c to be the same as the market price of the futures contract (e.g., $3.00/Kg). The forwarder may also specify some other price (e.g., $4.00/Kg), hoping that someone may need to make the spot purchase for capacity block 862c. Due to supply and demand, the price will likely be determined by the market.

Further, the forwarder also needs to purchase another capacity block to replace capacity block 862c. For example, the forwarder may purchase on the adjustment market another 20 T for Friday departure in the first week of November 2004 from Hong Kong to SFO. In the end, the forwarder may end up with capacity blocks 862a and 862b and a replacement 20-ton capacity block from Hong Kong to SFO for Friday departure as well, all for $2.75/Kg (as shown in block 868). Of course, if the forwarder already has a replacement capacity block from another of his orders, the forwarder may simply perform the swap himself without having to resort to the adjustment market. This mode of adjustment is more likely for large-scale forwarders, who tend to have a large diversity of capacity blocks to adjust internally without having to trade in the adjustment market. However, FutureFreight provides the mechanism for adjustment market trading of capacity blocks for final adjustment if such is needed.

Once the forwarder is satisfied with the constituent air capacity blocks purchased, the forwarder may forward the data to an external booking system (blocks 870 and 872) whereby air capacity is actually booked on various aircrafts for loading and shipping at the date of performance.

Although not shown in FIG. 8C, the purchased trucking futures contract may be similarly broken down by FutureFreight into constituent trucking capacity blocks, and the constituent trucking capacity blocks may be adjusted, either internally with the forwarder's other trucking capacity blocks or on the adjustment market. Further, once the forwarder is satisfied with the constituent trucking capacity blocks purchased, the forwarder may forward the data to an external booking system where trucking capacity is actually booked on various trucks for loading and shipping at the date of performance. This is shown in blocks 874 and 876 of FIG. 8C.

Figure 9:
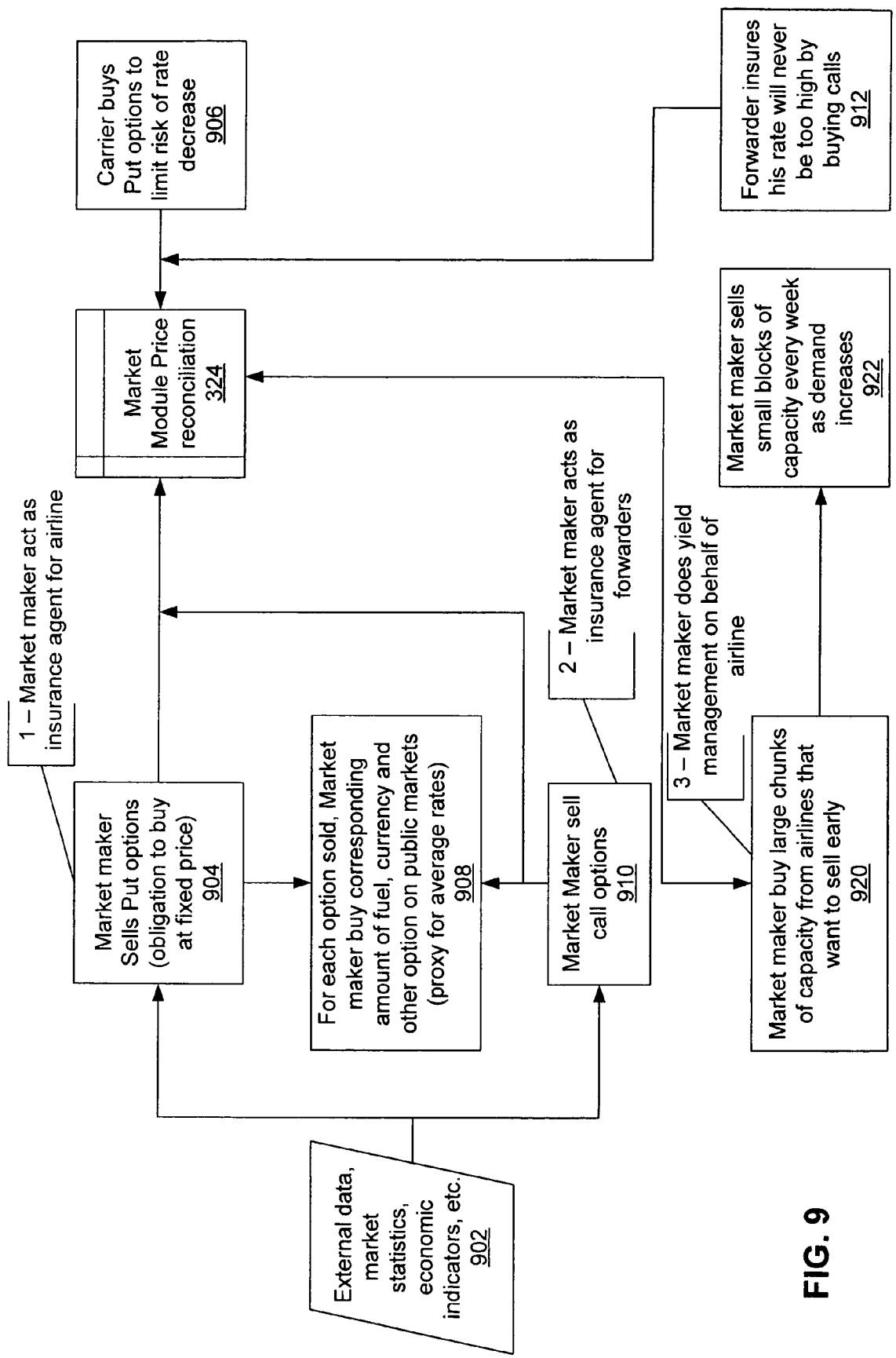
FIG. 9 illustrates, in an embodiment, the process by which market makers limit risks for carriers.

FutureFreight also enables market makers to participate in various ways to limit risks to carriers and forwarders. FIG. 9 illustrates, in an embodiment, the process by which market makers limit risks for carriers. Employing their knowledge of the industry and other external market data (902), market makers may sell (904) put options, which grant the right to carriers to sell capacity at a fixed price on a fixed date or in a fixed date range. These put options may be purchased (906) by carriers. By purchasing the put options, the carriers can essentially insure themselves from undue loss since the carriers can be certain that the capacity covered by the put options can always be sold to the market makers, who have the obligation to buy at a fixed price on a fixed date or in a fixed date range.

These transactions are accomplished via the Futures and Options Module, such as that shown in 324 of FIG. 3 and FIG. 9. Further, the market makers may cover the risks associated with the sold put options by buying other options (908), such as those covering fuel, currency, etc. on other public markets to offset the risks associated with the sold put options. If the market maker covers his risks carefully, there is profit to be made from the sale of the put options to the carriers without much risk to himself.

FIG. 9 also illustrates, in an embodiment, the process by which market makers limit risks for forwarders. Employing their knowledge of the industry and other external market data (902), market makers may sell call options (910), which grant the right for forwarders to purchase capacity at a fixed price on a fixed date or in a fixed date range. These call options may be purchased (912) by forwarders. By purchasing the call options, the forwarders can essentially insure themselves against undue loss since the forwarders can be certain that the capacity covered by the purchased call options can always be bought from the market makers, who have the obligation to sell at a fixed price pursuant to the call options. Again, the market makers may cover the risks associated with the sold call options by buying other options, such as those covering fuel, currency, etc. on other public markets to offset the risks associated with the sold call options.

Alternatively, market makers may perform yield management on behalf of carriers, such as airlines or rail or trucking companies or shipping companies. For example, a carrier may know in advance that they have 2000 tons of shipping from Hong Kong to Oakland available in one year but may not wish to handle the process of monitoring the market and be involved with timing/selling activities. If this carrier were to put the entire available capacity out to the market at once, price may be depressed, which hurts the profitability of the carrier. In these cases, market makers may, using the Futures and Options Module such as that shown in 324 of FIG. 3 and FIG. 9, purchase a large capacity block (920) from the carrier and resells the capacity in smaller blocks over time (922) in the futures or option market, thereby stabilizing price and improves profitability for the carrier.

Figure 10A:
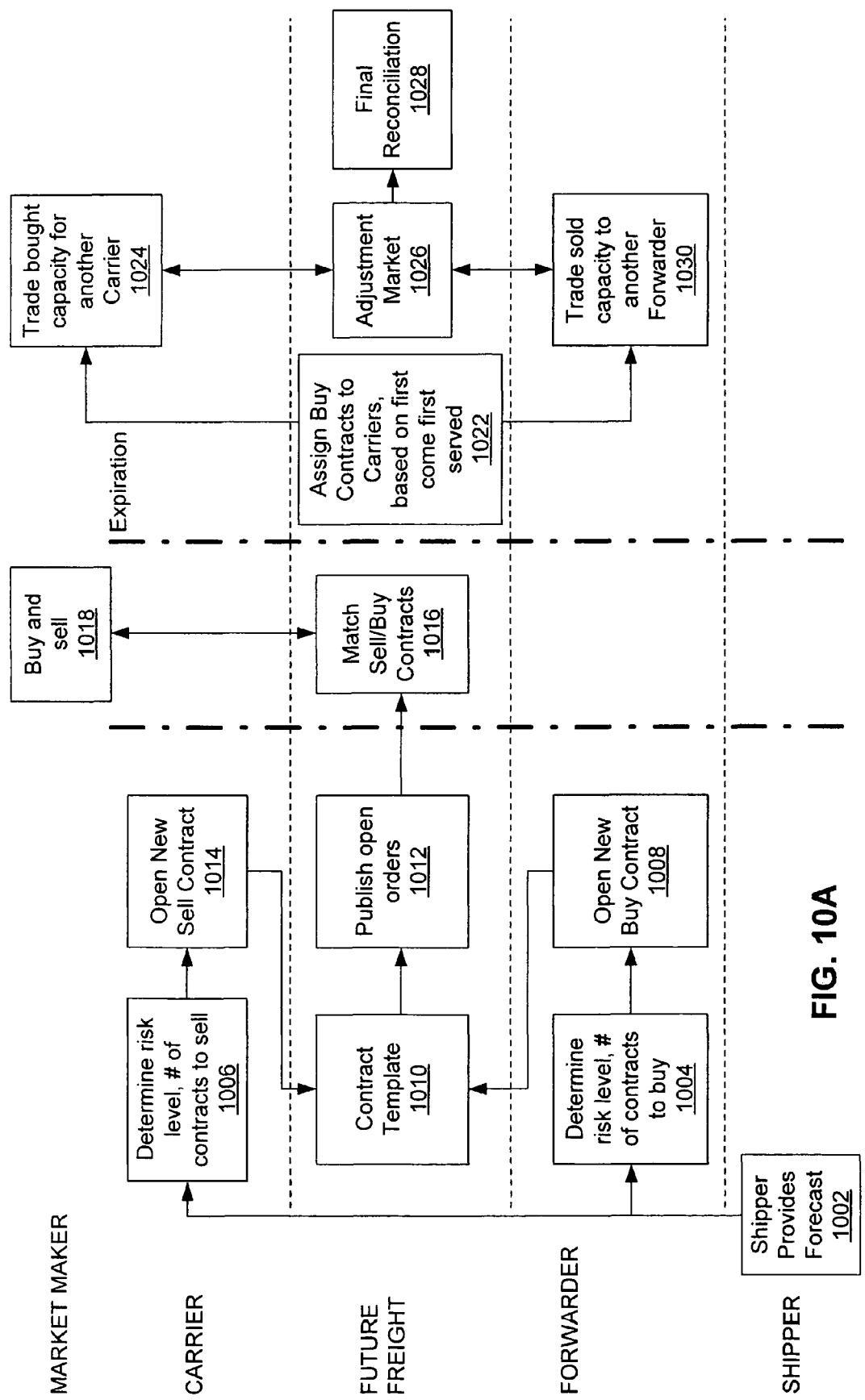
FIGS. 10A and 10B show, in accordance with one embodiment of the present invention, the order fulfillment process for carriers and forwarders.
Figure 10B:
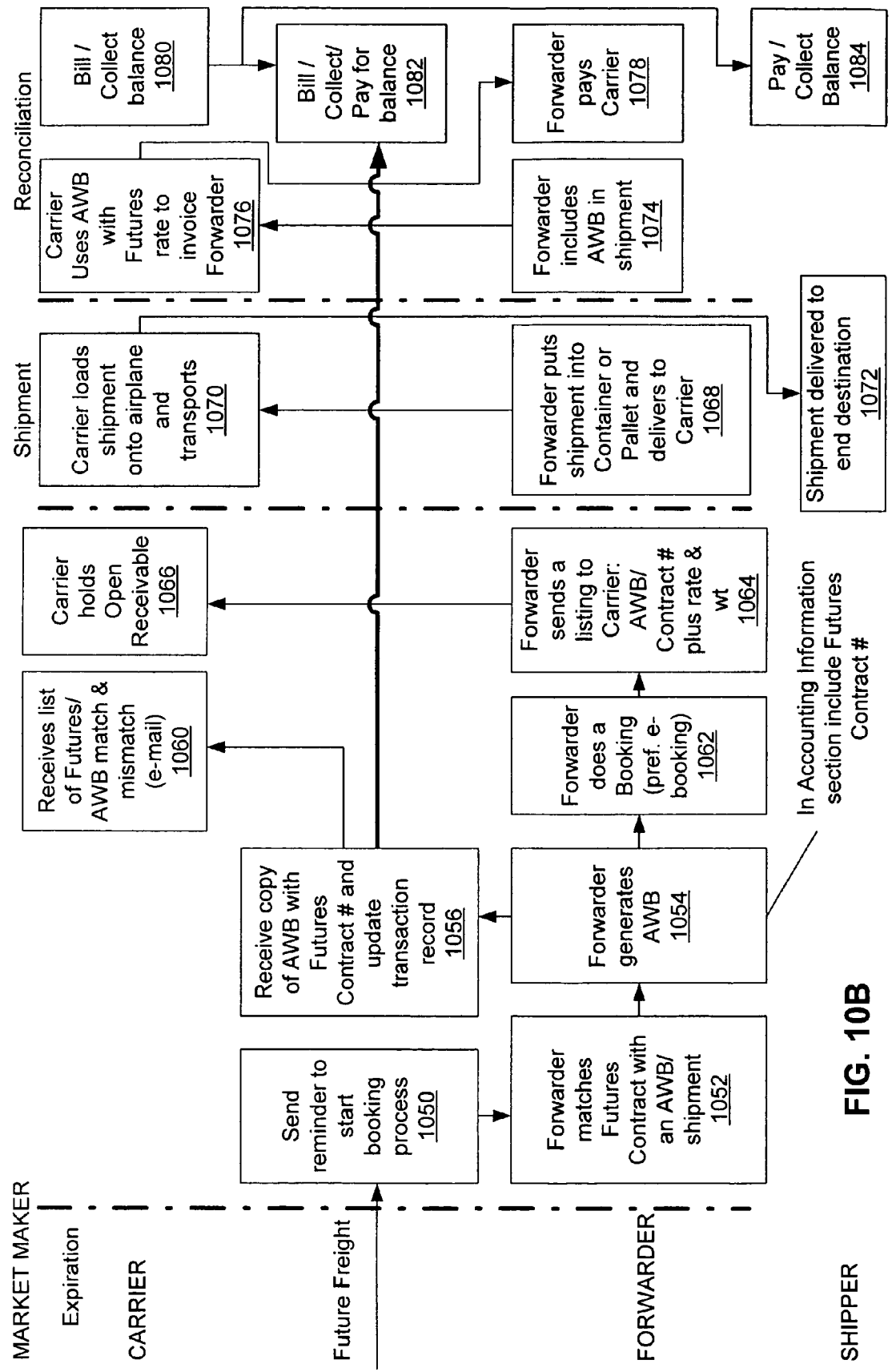

FIGS. 10A and 10B show, in accordance with one embodiment of the present invention, the order fulfillment process for carriers and forwarders. From the shippers' forecasts (1002), which are disseminated by FutureFreight, the forwarder assesses the risk level associated with the forecast and determines the quantity of futures contracts to purchase (1004). Using a contract template provided by FutureFreight, the forwarder may then publish the open buy orders on the FutureFreight system (blocks 1008, 1010 and 1012). Likewise, the carrier determines the risk level associated with the forecast and the quantity of futures contracts to sell (1006). Using a contract template provided by FutureFreight, the carrier may then publish the open sell orders on FutureFreight (blocks 1014, 1010 and 1012).

The open sell and buy orders may then be bundled to enhance trading and matched (1016) by FutureFreight using the parameters specified as matching keys. Various matching algorithms may be employed, including for example, first-come-first-served for potential matches have similar parameters. Market makers also participate in the process by buying and selling (1018) the futures contracts up to the time of their expiration. The same sequence occurs for different futures contracts covering the different modalities required for the complete end-to-end transport.

FIG. 11 shows, in accordance with one embodiment, a contract template for allowing a participant to specify a new contract to buy or sell to FutureFreight. In FIG. 11, the Required section shows exemplary parameters that, in one embodiment, must be specified for a contract. The Optional section shows exemplary parameters that may be specified for trading in the adjustment (i.e., secondary) market.

In the Required section, "Action" field may include a choice to Buy or Sell. "From" and "To" fields indicate the origination and destination points. "Month" and "Day of Week" fields specify the time of performance. "Type of Order" choices may include Market or Limit. Market removes price restriction on an order. Limit requires the creator to assign a limit price to sell now lower than for a Sell, or no higher than for a Buy order. The Limit price is then assigned in the box titled "Price". "Service Level" field may include, for example, Express, one-day, three-day, etc.

Dimensional weight, also known as trade weight, refers to the weight used by the industry to compute shipping cost. This dimensional weight may be different from actual weight. For example, a ton of Styrofoam may weigh only one ton in actual weight but may be deemed ten tons of dimensional weight due to the fact that Styrofoam has a low density and may take up a lot of room in the shipping vessel. The dimensional weight is represented by the "Dim Wt" field of FIG. 11. "Price" field indicates the pricing.

As shown in FIG. 11, the order may also be made private or public. If made private, only a set of designated participants is allowed to view the order. The "Type of Trading" may include two choices, one for Futures and one for Options.

In the Optional section, exemplary fields for trading an air shipment order in the adjustment market are shown. The fields of course may be adapted to sea or trucking or any other mode as necessary. "Airlines" field indicates the airline or airlines of interest. "Position" field indicates the desired loading position on the plane. "Cargo Type" field indicates the type of cargo involved (e.g., electronics, perishable, etc.)

Returning now to FIG. 10A, the contracts are assigned to carriers based on first-come-first serve or another assignment basis upon contract expiration (1022). The expiration date may be sometime before the actual performance date (e.g., two weeks). The forwarder may buy (1024) or sell (1028) the constituent capacity blocks (after they are broken out from the purchased futures contract) using the adjustment market facility (1026) of FutureFreight. Final reconciliation (1030) indicates that constituent capacity blocks purchased via the futures contract mechanism (and optionally via the adjustment market) are ready to be booked on the actual flights/trucks/rail/ships.

Referring now to FIG. 10B, once final reconciliation is achieved, FutureFreight sends a reminder (1050) to the forwarder to start the booking process. The forwarder may match the futures contract number with the shipment (1052). The forwarder may also generate an Airway Bill (AWB), which is an electronic document generated by the forwarder (1054) that contains the details of the shipment, including the futures contract number with which the shipment is associated. Both the AWB and the futures contract number are forwarded to FutureFreight for updating the transaction record (1056).

FutureFreight then sends (1060), via email or another electronic communication technique for example, a list of futures/AWB matches and a list of futures contracts that have not been converted into AWB. The list of unmatched futures contracts serve to highlight to the carriers of a potential problem, namely the possibility of unfilled or unclaimed shipping capacity. The carriers may then take action to resolve the problem prior to actual performance date (e.g., by contacting the forwarder to resolve any misunderstanding or by putting the capacity on the market to try to sell).

With the AWB, the forwarder may then book the capacity (1062) using, for example, e-booking. The forwarder then sends a listing to the carrier that details the AWB/contract numbers of the shipments made, along with the rate and weight (1064). This data is employed to create an open receivable at the carrier (1066).

Thereafter, the forwarder places goods onto an appropriate container and delivers the shipment to the carrier (1068). At shipment time, the carrier loads up the goods and transports the goods (1070) to the final destination (1072).

During the financial reconciliation process, the carrier employs the AWB, which was included in the shipment by the forwarder (1074) to invoice the forwarder (1076). The forwarder pays the invoice (1078).

Since an order can be traded several times before being executed, there may be third parties that need to pay/receive money but who are not named in the final airway bill and/or shipment bills. Examples include traders who participate in trading on a particular contract when such contract is traded multiple times prior to being executed. In blocks 1080, 1082, and 1084, these parties are billed and/or paid. Fees due to FutureFreight for the service provided may also be collected by FutureFreight at this stage.

In one embodiment, FutureFreight receives a transaction fee for every matched transaction. The fee is taken out of the settlement amount between the buyer and the seller. In one embodiment, FutureFreight adds the transaction fee on top of the price assigned by the seller. The buyer sees the seller price inclusive of the transaction fee. When the buyer pays the seller, the money is transferred through a Clearing House. The Clearing House then captures the fee from the money the buyer paid and passes the fee on to FutureFreight. Other commission-based arrangements are also possible.

Figure 12D:
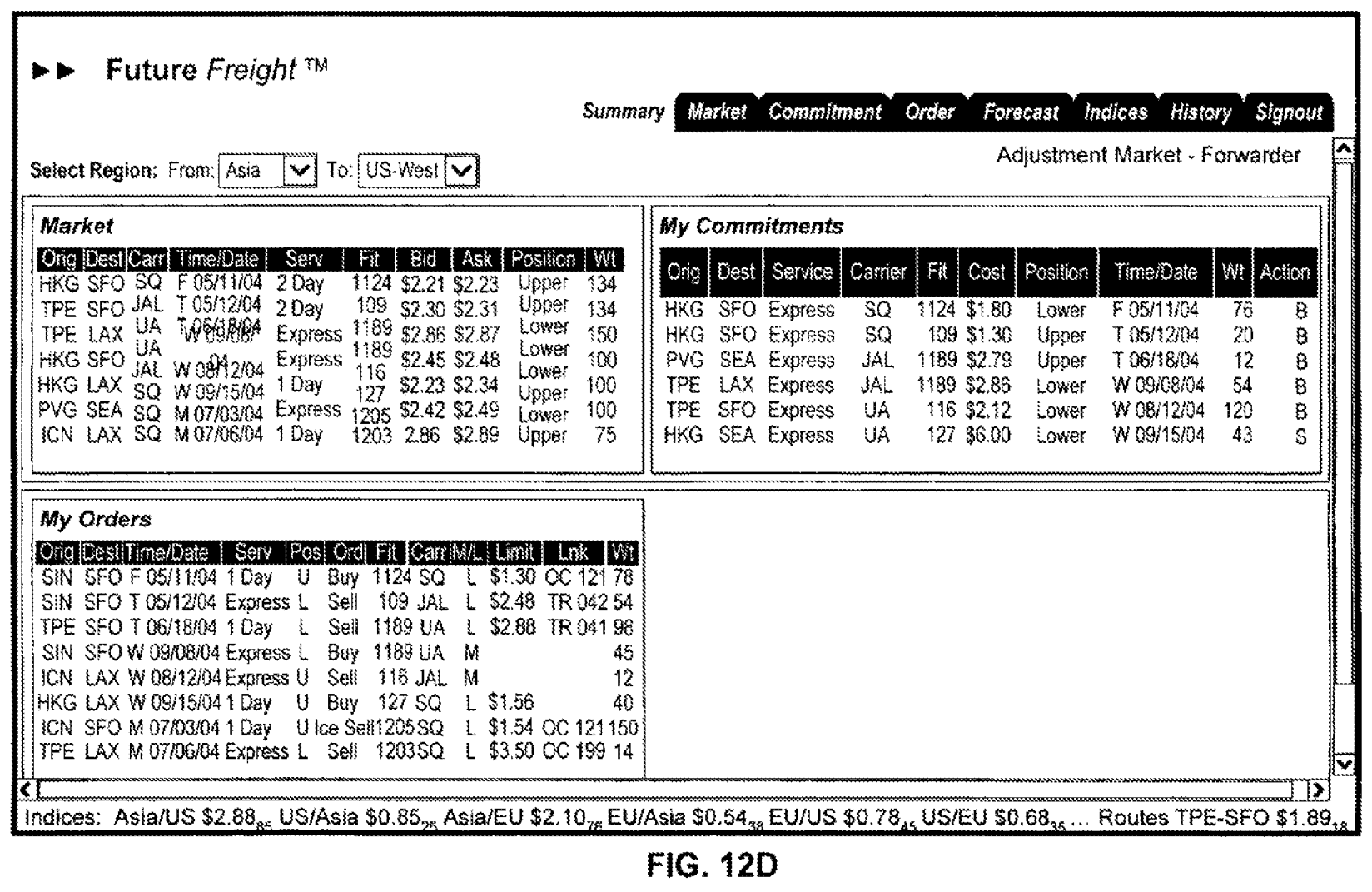

FIG. 12A shows, in accordance with one embodiment, a control panel as seen by the forwarder when transacting futures. In an embodiment, the control panel of FIG. 12A and other user-accessible panels are configured to be presented to the properly authenticated user when the user employs a web browser to access FutureFreight website, which hosts the FutureFreight trading platform. In block 1202 ("Market" or "Market View"), the open (i.e., unmatched or unfilled) futures contract offers that are submitted by forwarders, carriers, and/or market makers are shown. Each of these open futures contract offers include, for example, the origination and destination ports, the month of performance, the service level, the bid and ask prices, and the weight of the shipment.

In block 1204 ("My Orders"), the unfilled futures contract offers for this particular forwarder are shown. Each of the unfilled futures contract offers include, for example, the origination and destination ports, the month of performance, the service level, the type of order, the limit price, and the weight.

In block 1206 ("My Commitments"), the futures contracts already matched by FutureFreight for this particular forwarder are shown. Each of the matched futures contracts include, for example, the origination and destination ports, the month of performance, the service level, the price at which the futures contract is bought and the current price, the amount gained, the percentage of the shipper forecast represented by the matched futures contract, weight, and action (e.g., buy/sell).

In block 1208 ("Forecast"), the forecasts from shippers working with this particular forwarder are shown. Each forecast may include, for example, the origination and destination ports, the identity of the shipper making the forecast, the month of performance, the cargo type, the volume forecasted to be shipped, the actual weight, the trade weight, and ratings of the forecast quality. This forecast ratings may be based on personal judgment of the FFS operator, based on the self-assessment of the shippers submitting the forecasts ("Conf" for confidence level), and/or based on historical data, including a comparison between forecasted shipments and actual shipments in the past ("Qual" for Qualitative assessment). These ratings are discussed below in connection with FIG. 13.

FIG. 12B shows, in accordance with one embodiment, a control panel as seen by the carrier when transacting futures. In one embodiment, the carrier is not furnished with forecast data pertaining to specific shippers. Thus, in the "Forecast" panel of the example FIG. 12B, the forecasts and forecast ratings pertain to aggregate forecasts, not to specific forecasts by specific shippers (as in the case of the forwarder's control panel of FIG. 12A).

FIG. 12C shows, in accordance with one embodiment, a control panel as seen by the carrier when transacting options. Thus additional option-related parameters (such as the strike price ("Strike") or premium ("Prem") are also shown.

Once a futures contract expires, the participant's commitments may be moved to an Adjustment Control Panel to facilitate adjustment. Generally speaking, FutureFreight may assume that a component is acceptable to the participant (such as a forwarder) unless that forwarder specifies that adjustment or trading is desired with respect to that component. In FIG. 12C, the "Commitment" section shows the components slated for booking. Any of these components may be moved to the "Order" section of the Adjustment Control Panel of FIG. 12C in order to initiate adjustment or trading (e.g., on the spot market). The market view of the adjustment (e.g., spot) market is shown under the "Market" section of FIG. 12C. Through the Adjustment Control Panel of FIG. 12C, a participant such as a forwarder may buy/sell/trade individual components to adjust for any preference if the components obtained via the futures mechanism do not fully satisfy the participant's preferences.

Note that if an end-to-end order involves multiple components utilizing either a single or multiple modes (e.g., sea, air, rail, truck), the adjustment of anyone component segment may require the adjustment of another component. FutureFreight may assign either a weak or strong link between any two component segments of an end-to-end order (using, e.g., a system-generated flag associated with internally generated identifiers that identify component segments). These links are shown, for example, in the column "LNK" under "My Orders" in FIG. 12D. The user can readily review data pertaining to the linked component segment by, for example, double-clicking on the link (e.g., "OC 121"), which may bring up details pertaining to the linked component segment in the same or a different window.

If the link is weak, FutureFreight alerts the participant if the adjustment of one or more component segments may result in a mismatch vis-à-vis one or more of the other component segment in terms of time (e.g., adjustment of the air component may cause the shipment to miss the time of departure of the trucking component) or location (e.g., adjustment of the rail component may require the arrangement of an additional transportation transfer arrangement to accomplish the current trucking component) or upon violating any specified condition (e.g., this shipment requires a special offloading or storage facility, and the proposed adjustment results in shipment to a particular port that does not have the required offloading or storage facility). If the link is strong, FutureFreight may enforce the additional adjustments in order to resolve the mismatches or to remove the violation of a specified condition. The specification of whether a link is strong or weak as well as the specification of any specified condition associated with a shipment or a shipping facility may be pre-programmed in the FutureFreight database and/or specified by the participant.

Although FIGS. 12A-12D show only air futures from Asia to US-West due to the parameters specified for those examples (e.g., short time en-route), it should be noted that the control panels may also show futures contracts for other modes (e.g., sea) if such futures contracts satisfy the requirements (e.g., if a longer transit time had been specified, which 34 makes sea transportation acceptable). In an embodiment, the futures contracts for all applicable modes may be displayed in the panel, even in the same panel such as panel 1202 of FIG. 12A. In another embodiment, an option to filter for mode may be furnished (e.g., via a drop-down menu, not shown in FIG. 12A) to allow the user to see the data unfiltered for mode or filtered for one or more modes only (i.e., to exclude some modes). The ability to view data pertaining to multiple modes in Market View, My Orders, My Commitments offer unique advantages and exceptional ease of use to traders and participants of the freight industry in general.

Additionally, although only the panels "Market," "My Orders," "My Commitments" and "Forecasts" of FIGS. 12A-12D are shown in a single browser window, it is also possible to implement them in different browser window so as to allow the viewer to see all panels simultaneously but in different browser windows, to see only some but not all panels. It should also be noted that some users may not be allowed to see all panels that other users in the same category may be allowed to see. For example, a low-level employee of a forwarder may be allowed to only see the "My Commitments" but not "My Order" based on his login ID, while another employee of the same forwarder with a higher authority level may be allowed to see both "My Commitments" and "My Order."

Generally speaking, shippers have an incentive to provide an accurate forecast since an accurate forecast allows forwarders to purchase more capacity using low-cost mechanisms (e.g., futures) instead of forcing forwarders to hedge the risks using higher-cost mechanisms (e.g., spot market purchases). The inventors herein have developed an elegant and novel qualitative test for enabling shippers to specify a shipper confidence level (SCL), which may be employed by the participants to evaluate the shipper's forecast of shipping needs.

Figure 13:
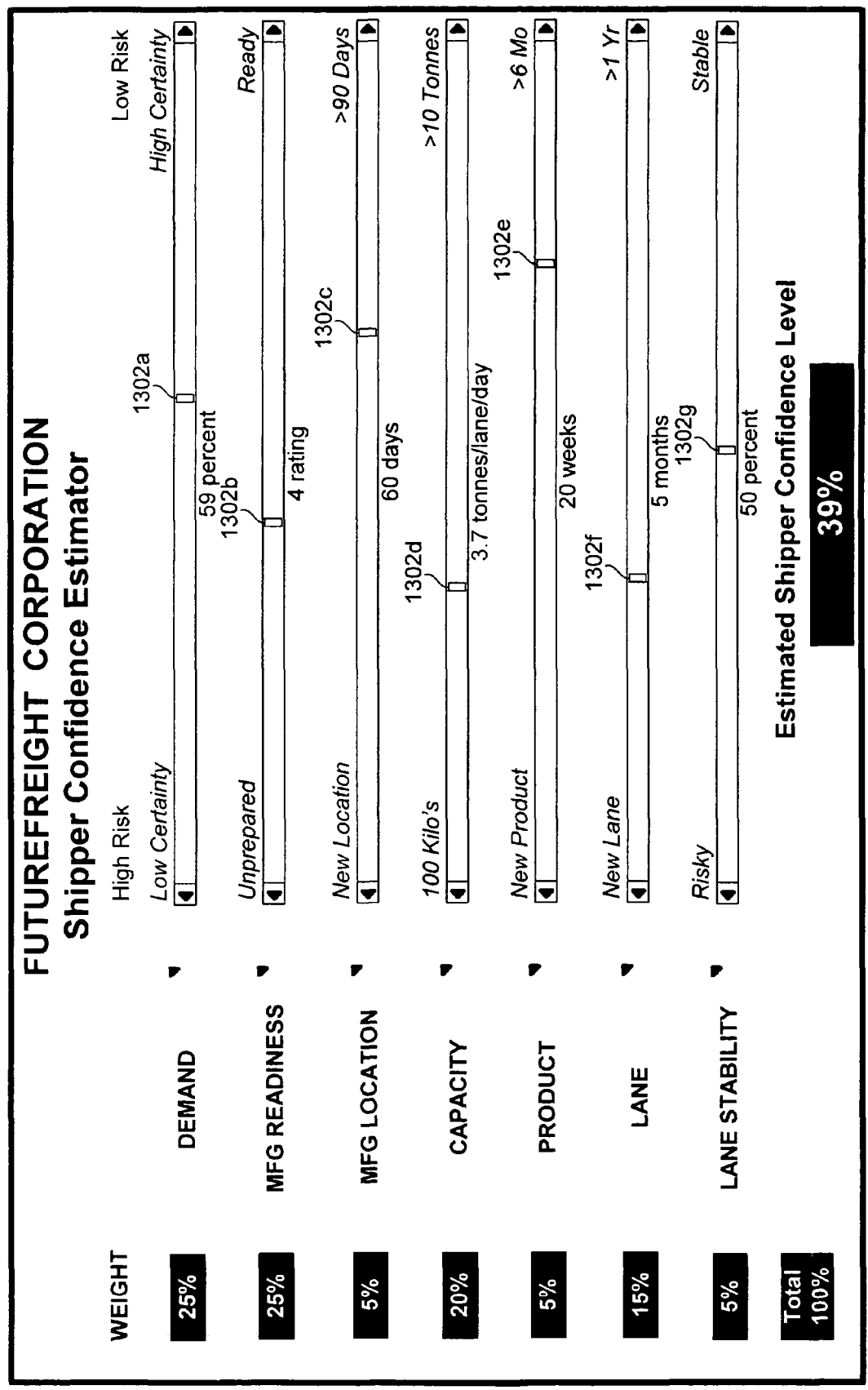
FIG. 13 shows, in accordance with one embodiment, a tool for permitting the shipper to specify the shipper confidence level (SCL).

FIG. 13 shows, in accordance with one embodiment, a tool for permitting the shipper to specify the SCL. The various factors comprising the SCL are shown in accompanying FIG. 14. These include, for example, Demand, Manufacturing Readiness, Manufacturing Location, Capacity, Product, Lane, and Lane Stability. Furthermore, each of these factors is given a weight (e.g., Manufacturing Readiness is weighed at 25% of the total value wherein Lane Stability is weighed at only 5%). By adjusting the slide (e.g., 1302*a*-1302*g*) associated with each of the SCL factors, the shipper can communicate his confidence in his forecast based on articulable criteria. The maximum confidence level, assuming that the shipper is 100% confident in every one of the factors, is 100%.

Using the tool of FIG. 13, the shipper may indicate on a sliding scale his subjective evaluation of each of these factors. For example, the customer demand may be indicated by the shipper to be between low certainty and high certainty for the products to be shipped. Manufacturing Readiness may vary between being unprepared to being completely ready, in terms of availability of supplied materials, internal resource readiness used to build products or parts, and/or any set up required to build the products/parts. Manufacturing location may vary between a new location (riskier) and an already established location (less risk). Capacity may vary between 100 kg (less risk) to over 10 tonnes (high risk). The maturity of the Product may vary between being a new product (more risk) to a product over 6 months old (more mature). The Lane factor evaluates the number of months a particular communication lane has been used for shipping. This rating may vary between being a new lane (high risk) to an established lane (less risk). Lane Stability evaluates the stability of the lane being used for shipping. Lane Stability may vary from being highly risk to being highly stable. Once the shipper specifies the values for these SCL factors via the slides, an estimated SCL may be estimated (shown to be 39& in FIG. 13).

In addition to the forward-looking SCL, FutureFreight also generates a Forecast Quality Index (FQI) to assist participants in evaluating forecasts from shippers (and even in evaluating capacity forecasts from carriers). FQIs provide a quantitative measure of the quality of the forecast and are statistical functions based on the variance between the forecast data and the actual ship data. FQIs are obtained by mining historical records pertaining to forecasts and actual ship data from shippers. FQIs may be performed on a location/customer basis (e.g., a XYZ plant in Singapore) or may be aggregated at a customer level/geography basis (e.g., all XYZ facilities in Southeast Asia).

Figure 15:
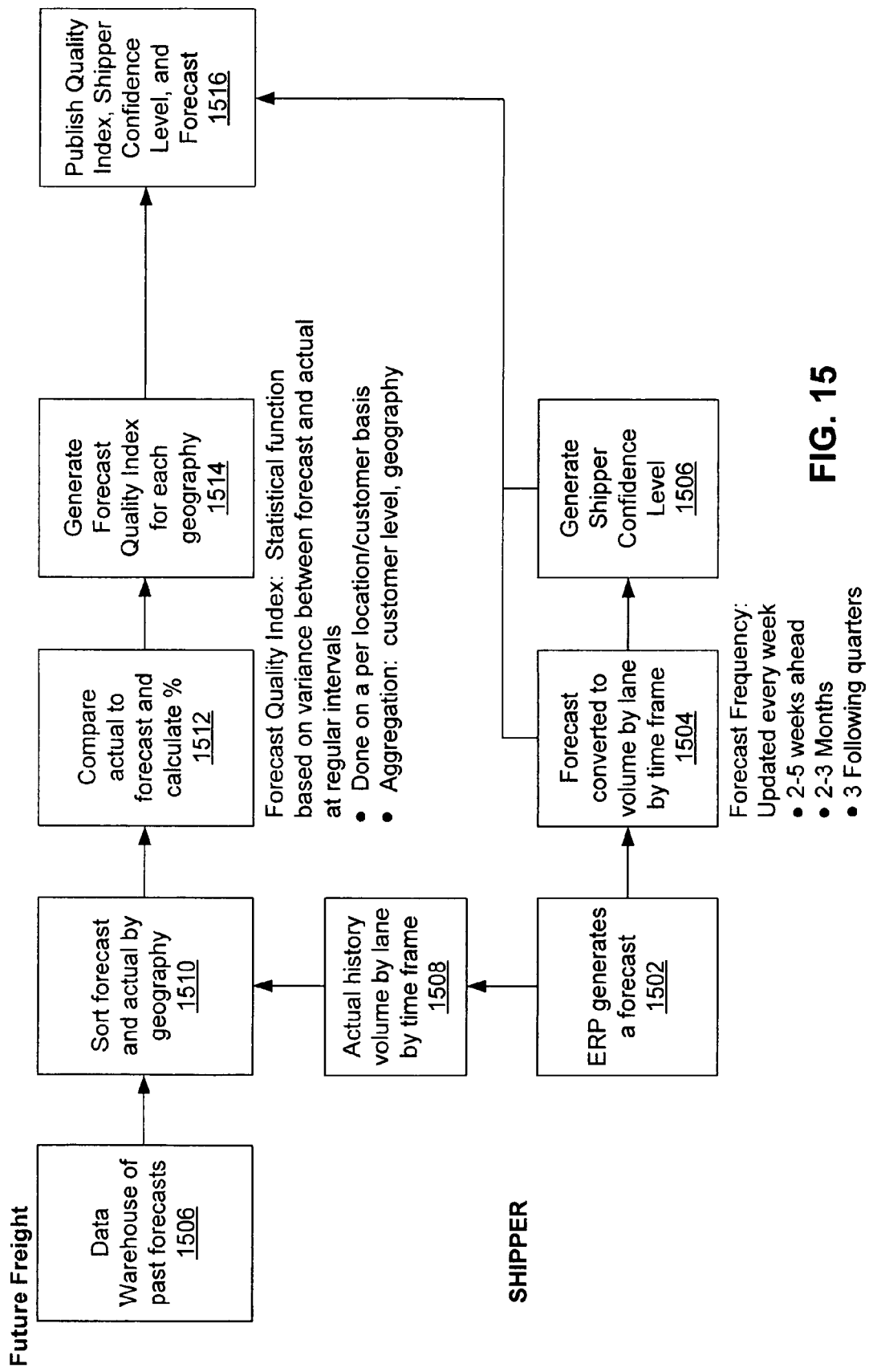
FIG. 15 shows, in accordance with one embodiment of the invention, how FFS calculates both the qualitative and the quantitative assessment values for a shipper's forecast.

FIG. 15 shows, in accordance with one embodiment of the invention, how FFS calculates both the qualitative and the quantitative assessment values for a shipper's forecast. The process begins with a forecast provided by, for example, the shipper's ERP (Enterprise Resource Planning) software (1502). The forecast is converted to volume by lane and/or timeframe (1504), and the shipper may indicate his own qualitative assessment (Shipper Confidence Level in 1506) of the accuracy of the forecast (e.g., using the tools and techniques discussed earlier in connection with FIGS. 13 and 14.

To calculate the quantitative Forecast Quality Index (FQI), FFS first extracts past forecast data from a data warehouse of past forecasts (1506). Furthermore, actual historical shipping volume may also be extracted from a data warehouse of historical shipment volume or from the shipper's ERP software (1508). The historical forecast data and actual ship data may then be sorted by geography or by another sorting criteria to facilitate comparison. In block 1512, the historical forecast data and actual ship data are compared (1512). The FQI (for the geography in the example of FIG. 15) is generated (1514), which is published by FutureFreight along with the SCL and the forecasts by the shippers. Of course, FFS can also sort the historical forecast data and actual ship data using another criteria to furnish the participants with a different way to assess the forecast quality if desired. The forecasts, the FQI, and/or the SCL are then published to the participants using an appropriate FFS user interface (1516).

In one embodiment, all traders (i.e., any participant who is involved in the buying and selling of futures or options) are furnished with aggregate forecasts data and forecast ratings that do not identify a particular shipper. Further, the freight industry indices that do not specifically identify a particular participant are also furnished to all traders by FutureFreight. This enables traders to intelligently evaluate the buying/selling of futures, thereby increasing confidence in futures trading and increased participation in the futures market, which lead to improved liquidity.

On the other hand, due to business competition, shippers, forwarders, and carriers have a strong desire to keep certain data confidential from potential competitors and/or the trade press. The inventors herein further recognize that some participants may fraudulently pose as being in a different role (e.g., a shipper posing as a forwarder or market maker) in hope of obtaining competitive information about his competitors. The challenge thus is to create a system that can furnish information to encourage fair and efficient fulfillment of freight orders (including trading by traders) while at the same time safeguarding the competitive interests of the participants.

In an embodiment, each participant is authenticated and/or contractually obligated to prevent the participant from misusing the information obtained from FutureFreight to the detriment of other participants. Authentication may include log-in and password protection. Authentication may also lead to restriction, based on the participant's identity, to access only one or specified ones of the application windows (e.g., Forecast, My Orders, My Commitment or Market View). Authentication may also lead to restriction, based on the participant's identity, to limit functional authorization to buy/sell/cancel orders.

In an embodiment, the default data security options may specify that the Summary Screen and the Market View are visible to all users while My Orders and My Commitments are only visible to participants who initiate those orders. However, these default data security options may be modified as will be discussed hereinbelow, which may be considered additional or alternative to the default data security options.

One of the strengths of FutureFreight is the rich set of data security options, which allow participants to tailor who can receive which specific set of data. Thus, in addition to the default data security options, there may exist data security options that can be specified by participants. These participant-specified data security options may supplement or supersede the default data security options. Thus, for example, even if FutureFreight furnishes certain information to a certain participant or group of participants pursuant to a default data security option, any participant can restrict information pertaining to himself, and such participant-specified data security option would over-ride the system default data security option.

For example, in an embodiment, a participant (e.g., a shipper) may elect to limit certain information (e.g., the shipper's shipment or forecast data) to a specific set of recipients (e.g., a specific set of forwarders). As another example, a shipper may further limit a forwarder's access to shipment and/or forecast data. Instead of allowing a specific forwarder access to data pertaining to all shipment lanes, a shipper may restrict that forwarder to information pertaining to, for example, only one or more specific shipment lanes, one or more specific locations, one or more modes, and/or one or more time periods.

Shippers, who may be manufacturers, naturally have a strong desire to keep their shipment data confidential since such data, if revealed in an untimely manner, can be used to adverse effects by competitors. Thus, in an embodiment, shippers do not access any data (unless they are registered traders such as forwarders). Alternatively or additionally, in an embodiment, a shipper only sees the rating of his own forecasts. Alternatively or additionally, in an embodiment, a shipper can only see freight indexes with average prices. Alternatively or additionally, in an embodiment, a shipper may even be prevented from viewing aggregate forecast data (based on geography, for example) to keep that shipper from being able to deduce information about his competitors who may be shippers from/to the same location. Alternatively or additionally, in an embodiment, unless there is a need, a shipper is not entitled to view individual orders (buy or sell) from forwarders, carriers and market makers and/or the market view (the view of the futures trading market, including data pertaining to trades in futures contracts). This is to prevent a shipper from inappropriately obtaining data (such as forwarder's cost data).

Generally speaking, forwarders may be allowed access to aggregate forecasts by shippers (based on geography and/or time, for example). To ensure additional data security, information identifying specific shipment orders or forecasts by a specific shipper may not be furnished to a forwarder, unless that forwarder is specifically approved to receive such information by the shipper. Alternatively or additionally, a forwarder may not access the capacity release orders by carriers, unless access to such information is specifically authorized by the carriers. Forwarders are generally permitted to see the market view as well as freight indices.

Carriers are generally not allowed to access a specific shipper's individual forecast data, unless such is specifically authorized. Generally speaking, a carrier may view the aggregate forecast data (e.g., by geography), along with aggregate forecast ratings. A carrier may also access the market view, along with freight indices.

A market maker only accesses data necessary to evaluate and perform trading in the bundled futures contracts. Accordingly, it is generally not necessary for a market maker to access the forecast data pertaining to a specific shipper. As another example, a market maker may not be allowed to view the individual orders from specific forwarders or specific carriers. Generally speaking, a carrier may view the aggregate forecast data (e.g., by geography), along with aggregate forecast ratings. A carrier may also access the market view, along with freight indices.

While this invention has been described in terms of several preferred embodiments, there are alterations, permutations, and equivalents which fall within the scope of this invention. For example, given the disclosure, one skilled in the art can apply many of the techniques, which have been disclosed using futures to facilitate discussion, to options and/or a combination of futures and options. Accordingly, embodiments of the invention apply to derivative contracts, which include futures contracts and/or options contracts. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for facilitating shipment of freight, comprising:
receiving, via a first real-time interface in a networked computer system, shipping capacity data for shipment of freight between a first geographic location and a second geographic location, at a time or in a time frame by at least one of an air mode, a sea mode, a rail mode and a truck mode of transportation,
wherein the shipping capacity data include information about at least one of pricing, availability, volume, and quality;
displaying, via a second real-time interface in the networked computer system, parameters for one or more contracts for shipment of freight, the parameters corresponding to one or more portions of the shipping capacity data, each of the one or more portions having one or more specified modes of transportation, at least one of the one or more contracts being a derivative contract;
receiving commitment data from a seller and a buyer for at least one of the one or more contracts, the commitment data or the at least one of the one or more contracts having an expiration time;

responsive to the commitment data from at least one of the seller and the buyer, executing the at least one of the one or more contracts prior to the expiration time; and electronically communicating data for performance according to the executed contract, thereby facilitating shipment of freight.

2. The method of claim 1, wherein the derivative contract is a futures contract or an options contract.

3. The method of claim 1, wherein the derivative contract is a forward contract.

4. The method of claim 1, wherein the one or more contracts includes a contract for a spot-market purchase.

5. The method of claim 1, further comprising displaying a pricing index pertaining to the shipping capacity.

6. The method of claim 5, wherein executing the at least one of the one or more contracts depends on a value of the pricing index.

7. The method of claim 1, further comprising displaying a forecast pertaining to the shipping capacity.

8. The method of claim 1, further comprising displaying an assessment value pertaining to the shipping capacity.

9. The method of claim 8, wherein the assessment value is indicative of carrier reliability or shipper reliability.

10. The method of claim 1, wherein the shipping capacity data indicates capacity for shipping by at least two of an air mode, a sea mode, a rail mode and a truck mode of transportation.

11. The method of claim 1, wherein the parameters for at least one of the one or more contracts for shipment of freight correspond to first portion of the shipping capacity data having a first mode of transportation, and a second portion of the shipping capacity data having a second mode of transportation, wherein the first mode of transportation is different from the second mode of transportation.

12. The method of claim 1, wherein the derivative contract is a contract for bundled shipping capacity.

13. The method of claim 12, wherein the bundled shipping capacity is shipping capacity bundled according to time.

14. The method of claim 12, wherein the bundled shipping capacity is shipping capacity bundled according to geography or transportation mode.

15. The method of claim 12, wherein the bundled shipping capacity is shipping capacity bundled according to two or more of time, geography and transportation mode.

16. The method of claim 1, further comprising at least one of: booking freight, updating a shipping transaction record, generating a shipping document, adjusting parameters necessary for final execution of a shipment, putting freight into a container or pallet, loading freight onto a carrier, and shipping freight.

17. The method of claim 1 further comprising providing a report regarding available shipping capacity.

18. The method of claim 1, further comprising displaying information pertaining to at least one of: an indicated time, the first or second geographic location, and the at least one mode of transportation.

19. The method of claim 18, wherein the information is in the form of two or more of: a pricing index, a forecast and an assessment value.

20. The method of claim 1, wherein electronically communicating data for performance according to the executed contract comprises at least one of:
generating a Bill of Lading;
reconciling a buy order and a sell order;
sending information via a booking system interface for booking freight; and
adjusting parameters necessary for final execution of shipment.

21. The method of claim 1, wherein: the buyer comprises at least one of a shipper, a carrier, a forwarder, and a market maker; and the seller comprises at least one of a shipper, a carrier, a forwarder and a market maker.

22. The method of claim 1, wherein: the parameters for one or more available contracts for shipment of freight include a price for shipping capacity between the first geographic location and the second geographic location.

23. A computer-implemented method for facilitating shipment of freight, comprising:
receiving, via a real-time interface in a networked computer system, shipping capacity data for shipment of freight via one or more routes between a first geographic location and a second geographic location, by at least one of an air mode, a sea mode, a rail mode and a truck mode of transportation,
wherein the shipping capacity data include information about at least one of pricing, availability, volume, and quality;
displaying one or more terms for each of a plurality of time-limited derivative contracts for shipment of freight, the terms corresponding to some or all of the shipping capacity data;
displaying at least some of the shipping capacity data corresponding to at least one of the time-limited derivative contracts that are open;
responsive to a commitment for one or more of the time-limited derivative contracts from a buyer or a seller, executing one of the one or more time limited derivatives-contracts based on the commitment before the expiration of the time limited derivative contract; and
electronically communicating data for performance according to the executed contract, thereby facilitating shipment of freight.

24. The method of claim 23, wherein the specified shipping capacity data indicates capacity for shipping by at least two of an air mode, a sea mode, a rail mode and a truck mode of transportation.

25. The method of claim 23, wherein the plurality of time limited derivative contracts includes at least one contract for bundled shipping capacity.

26. The method of claim 23, wherein: the one or more terms for each of the plurality of time-limited derivative contracts include a price term.

* * * * *